United States Patent
Kawai

(10) Patent No.: US 8,405,768 B2
(45) Date of Patent: Mar. 26, 2013

(54) MOVING IMAGE PROCESSING APPARATUS AND METHOD THEREOF

(75) Inventor: Ai Kawai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 504 days.

(21) Appl. No.: 12/621,337

(22) Filed: Nov. 18, 2009

(65) Prior Publication Data

US 2010/0123829 A1 May 20, 2010

(30) Foreign Application Priority Data

Nov. 20, 2008 (JP) ................. 2008-296695

(51) Int. Cl.
*H04N 7/01* (2006.01)
*H04N 5/14* (2006.01)
*H04N 9/64* (2006.01)
*H04N 5/202* (2006.01)
*G09G 3/36* (2006.01)
*G09G 5/00* (2006.01)
*G06F 3/038* (2006.01)

(52) U.S. Cl. .......... 348/441; 348/571; 348/674; 345/99; 345/208

(58) Field of Classification Search .......... None
See application file for complete search history.

(56) References Cited

U.S. PATENT DOCUMENTS

| | | | |
|---|---|---|---|
| 2006/0197732 A1* | 9/2006 | Oyaizu et al. | 345/99 |
| 2007/0273787 A1* | 11/2007 | Ogino et al. | 348/441 |
| 2007/0279531 A1* | 12/2007 | Muto | 348/674 |
| 2008/0129862 A1* | 6/2008 | Hamada et al. | 348/441 |
| 2009/0322720 A1* | 12/2009 | Inoue | 345/208 |

FOREIGN PATENT DOCUMENTS

| | | |
|---|---|---|
| CN | 1959803 A | 5/2007 |
| JP | 2002-351382 A | 12/2002 |
| JP | 2006-189661 A | 7/2006 |
| JP | 2007-052184 A | 3/2007 |
| JP | 2007-206651 A | 8/2007 |
| JP | 2008-185905 A | 8/2008 |
| WO | 2006/100906 A1 | 9/2006 |

* cited by examiner

*Primary Examiner* — Jefferey Harold
*Assistant Examiner* — Sean Haiem
(74) *Attorney, Agent, or Firm* — Canon USA, Inc., IP Division

(57) ABSTRACT

A distribution ratio Rt' of sub-frames Pt and Qt that correspond to an input frame Ft is calculated based on motion of an image in an input frame. The calculated distribution ratio Rt' is then corrected according to a distribution ratio Rt−1 between sub-frames Pt−1 and Qt−1 corresponding to an input frame Ft−1 which is to be reproduced before the input frame Ft. A distribution ratio Rt is thus acquired.

8 Claims, 18 Drawing Sheets

MOVING IMAGE PROCESSING APPARATUS AND METHOD THEREOF

BACKGROUND OF THE INVENTION

1. Field of the Invention

The present invention relates to a moving image processing apparatus that performs frame rate conversion.

2. Description of the Related Art

There is a double speed driving method for increasing the frame rate by generating a plurality of sub-frames from one input frame and sequentially reproducing the plurality of sub-frames. Japanese Patent Application Laid-Open No. 2002-351382 discusses an example of such a double speed driving method which reduces an occurrence of a false contour that can be sensed when an image moves in the input frame.

Japanese Patent Application Laid-Open No. 2002-351382 discusses a technique that reduces a high frequency component of one of the two sub-frames generated from the input frame, when the motion of the image in the input frame is large.

However, there are input frames that can cause a viewer to feel an irregularity when the sub-frames are displayed. More specifically, if the motion of the image in the input frame is a large, a smear (trailing) may be generated by the brightness component remaining in the sub-frame even if the high frequency component of the sub-frame is reduced.

SUMMARY OF THE INVENTION

The present invention is directed to a moving image processing apparatus that reduces the irregularity sensed in a displayed image when the sub-frames generated from the input frame are displayed, and a method thereof.

According to an aspect of the present invention, a moving image processing apparatus configured to generate a plurality of output frames from one input frame, the apparatus comprising, an input unit configured to input a first input frame and a second input frame following the first input frame, a determination unit configured to determine a first distribution ratio for generating at least a first output frame and a second output frame from the first input frame, and to determine a second distribution ratio for generating at least a third output frame and a fourth output frame from the second input frame according to a motion of an image in the second input frame, and a generation unit configured to generate the first output frame and the second output frame from the first input frame based on the first distribution ratio, and to generate the third output frame and the fourth output frame from the second input frame based on the second distribution ratio.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

The exemplary embodiments are examples, and the present invention is not limited to those examples.

Figure 1:
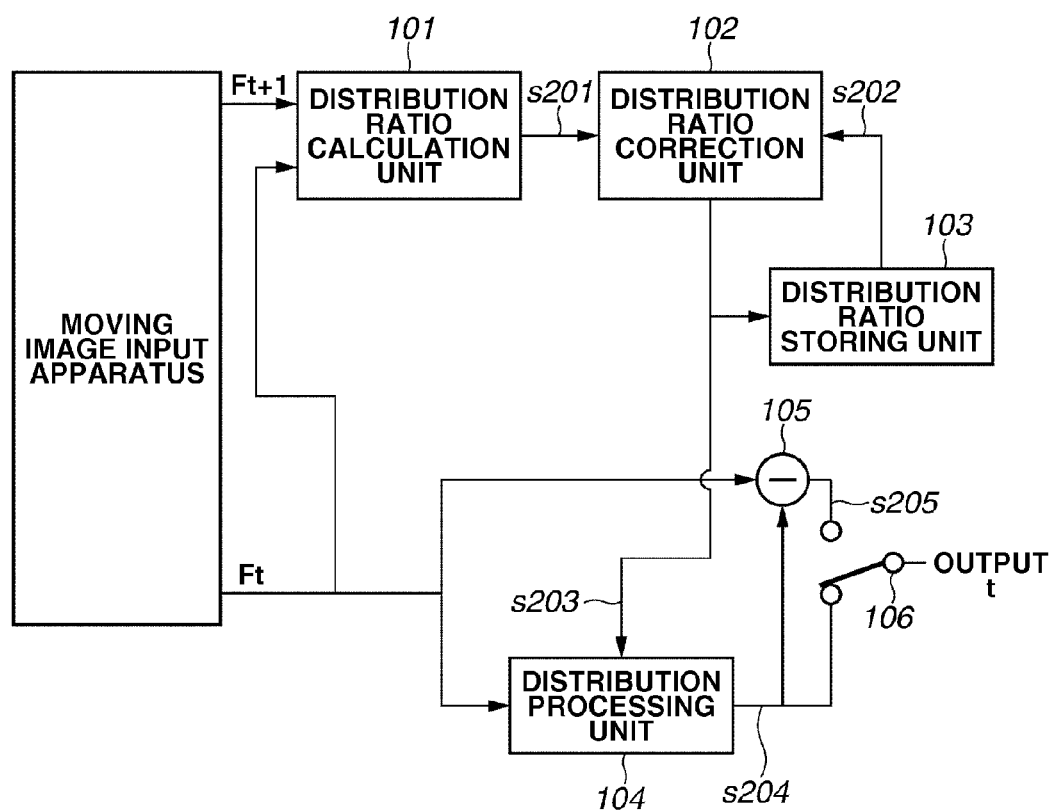
FIG. 1 is a block diagram illustrating the moving image processing apparatus according to a first exemplary embodiment of the present invention.

FIG. 1 is a block diagram illustrating a configuration of main components of a moving image processing apparatus according to a first exemplary embodiment of the present invention. The moving image processing apparatus includes a distribution ratio calculation unit 101, a distribution ratio correction unit 102, a distribution ratio storing unit 103, a distribution processing unit 104, a difference processing unit 105, and a switching unit 106.

Further, the moving image processing apparatus according to the present exemplary embodiment is connected to a moving image input apparatus (e.g., a video camera), which is used to capture and input moving images, and a display apparatus (e.g., a digital television), which displays the moving images. The moving image processing apparatus can be incorporated in the moving image input apparatus or the display apparatus.

Furthermore, the moving image processing apparatus according to the present exemplary embodiment generates a plurality of sub-frames (output frames) from one input frame based on a determined distribution ratio. The frame rate of the input frame is then increased a plurality of times the original frame rate by sequentially displaying the sub-frames (i.e., perform double speed driving).

More specifically, in the present exemplary embodiment, if the determined distribution ratio is 8:2, the moving image processing apparatus generates a first sub-frame whose pixel value is 0.8 times the pixel value of the input frame. The moving image processing apparatus further generates a second sub-frame whose pixel value is 0.2 times the pixel value of the input frame.

The moving image processing apparatus according to the present exemplary embodiment corrects the distribution ratio, which is calculated based on the motion amount of the image in the input frame according to the past distribution ratio. The distribution ratio calculation unit 101 thus calculates a distribution ratio R' based on the motion amount detected between each input frame.

The distribution ratio correction unit 102 corrects the distribution ratio R' calculated by the distribution ratio calculation unit 101 according to the distribution ratio of the past input frame stored in the distribution ratio storing unit 103. The distribution processing unit 104 and the difference processing unit 105 then generate the sub-frames from the input frame according to the distribution ratio R corrected by the distribution ratio correction unit 102.

Further, the present exemplary embodiment describes a case where the frame rate of the input frame (60 frames/second) is converted to the frame rate of the output frame (120 frames/second). However, the present invention is not limited to this. Furthermore, the present invention can be applied to an exemplary embodiment, which generates three or more sub-frames from one input frame.

The distribution ratio calculation unit 101 receives at time t an input frame Ft and an input frame Ft+1 from the moving image input apparatus. Further, an input frame Ft−1, which is to be reproduced before the input frame Ft and the input frame Ft are input to the distribution ratio calculation unit 101 at time t−1. The first input frame (i.e., input frame Ft−1) and the second input frame (i.e., input frame Ft) following the first input frame are thus input to the distribution ratio calculation unit 101.

Furthermore, a third input frame (i.e. input frame Ft+1) is input to the distribution ratio calculation unit 101. The distribution ratio calculation unit 101 then calculates among the input frames a distribution ratio Rt' of the input frame Ft according to the input frames Ft and Ft+1.

The input frame Ft is data of the frame to be reproduced at time t, and the input frame Ft+1 is data of the frame to be reproduced subsequent to the input frame Ft (i.e., at time t+1). In the present exemplary embodiment, the sub-frames generated from the input frame are reproduced.

Further, in the present exemplary embodiment, two sub-frames (Pt, Qt) are generated from the input frame Ft. If the distribution ratio of the input frame Ft is 6:4, the pixel value of the sub-frame Pt is 0.6 times that of the input frame Ft, and the pixel value of the sub-frame Qt is 0.4 times that of the input frame Ft.

The sub-frame Pt is reproduced before the sub-frame Qt. In the present exemplary embodiment, the distribution ratio is described based on the ratio of the pixel values of the sub-frame Q and the input frame F. For example, if the distribution ratio of the input frame Ft is 7:3, the pixel value of the sub-frame Pt is 0.7 times that of the input frame Ft, and the pixel value of the sub-frame Qt is 0.3 times the pixel value of the input frame Ft. The distribution ratio in such a case is indicated as 0.3.

Similarly, for example, if the distribution ratio is 9:1, the ratio is indicated as 0.1, and if the distribution ratio is 6:4, the ratio is indicated as 0.4.

Moreover, in the present exemplary embodiment, the distribution ratio of the sub-frames is determined so that the pixel value of the sub-frame P becomes higher than the pixel value of the sub-frame Q. As a result, the distribution ratio is set between 0.0 and 0.5. The distribution ratio can also be determined more minutely, or can be set so that the pixel value of the sub-frame Q becomes higher than the pixel value of the sub-frame P.

As described above, the moving image processing apparatus according to the present exemplary embodiment generates two output frames (i.e., sub-frame P and sub-frame Q) from the input frame. The frame rate is thus converted from 60 frames per second to 120 frames per second.

The distribution ratio calculation unit 101 calculates the distribution ratio R' based on the motion amount detected between the input frames. More specifically, the distribution ratio calculation unit 101 calculates the difference between the input frame Ft and the input frame Ft+1 to detect the moving region in the input frame Ft and the motion amount of the moving region.

If the detected motion amount is large, the distribution ratio calculation unit 101 calculates the distribution ratio Rt' of the input frame Ft so that a difference between the pixel values of the generated plurality of sub-frames P and Q becomes large.

The distribution ratio is calculated according to the motion amount for the following reason. If the motion amount in the input frame Ft is large and the difference between the pixel values of the sub-frames Pt and Qt is small, a motion blur of the moving region may become conspicuous.

In contrast, if the pixel value of the sub-frame Qt is sufficiently low as compared to the pixel value of the sub-frame Pt, the motion blur of the moving image caused by displaying the sub-frame Qt may become inconspicuous even when the motion amount between the input frames is large.

The distribution ratio calculation unit 101 according to the present exemplary embodiment thus calculates the distribution ratio Rt' of the input frame Ft so that the difference in the pixel values of the sub-frames Pt and Qt increases as the motion amount increases. In the present exemplary embodiment, the difference between the pixel values of the sub-frames Pt and Qt is greatest when the distribution ratio is 10:0 (0.0).

The method for acquiring the motion amount is not limited to the method that uses the difference between the pixel values. For example, the motion amount can be acquired from motion information such as motion vector information. The distribution ratio calculation unit 101 then outputs the calculated distribution ratio Rt' to the distribution ratio correction unit 102.

The distribution ratio correction unit 102 corrects the distribution ratio Rt' output from the distribution ratio calculation unit 101 according to the previous distribution ratios.

More specifically, the distribution ratio correction unit 102 corrects the distribution ratio Rt' of the input frame Ft according to the distribution ratio Rt−1 of the input frame Ft−1. The corrected distribution ratio acquired by the distribution ratio correction unit 102 is referred to as Rt.

Further, the distribution ratio Rt−1 is the distribution ratio acquired by the distribution ratio correction unit 102 by correcting the distribution ratio Rt'−1 calculated based on the input frame Ft and the input frame Ft−1, which is input before the input frame Ft. The distribution ratio correction unit 102 corrects the calculated distribution ratio Rt' so that the difference between the distribution ratio Rt of the input frame Ft and the distribution ratio determined for a previous input frame is within a predetermined range. The process of correcting the distribution ratio performed by the distribution ratio correction unit 102 will be described in detail below with reference to FIG. 3.

The distribution ratio correction unit 102 outputs the corrected distribution ratio Rt to the distribution ratio storing unit 103 and the distribution processing unit 104. The distribution ratio of the first input frame that is input from the moving image input apparatus can be output to the distribution processing unit 104 without correcting the output from the distribution ratio calculation unit 101.

The distribution ratio storing unit 103 stores the corrected distribution ratio R of the input frames that has been input until now. The distribution ratio storing unit 103 also outputs the stored distribution ratio R to the distribution ratio correction unit 102.

The distribution processing unit 104 generates the sub-frame Q according to the pixel value of the input frame and the corrected distribution ratio. For example, if the corrected distribution ratio of the input frame Ft is 7:3 (0.3), the distribution processing unit 104 generates the sub-frame Qt by multiplying the pixel value of the input frame Ft by 0.3. The distribution processing unit 104 then outputs the data of the generated sub-frame Q via the switching unit 106.

The difference processing unit 105 then generates the sub-frame P based on the sub-frame Q and the input frame F. For example, if the corrected distribution ratio of the input frame Ft is 7:3 (0.3), the difference processing unit 105 generates the sub-frame Pt by acquiring the difference between the input frame Ft and the sub-frame Qt.

As described above, the distribution processing unit 104 generates the sub-frame Qt by multiplying the pixel value of the input frame Ft by 0.3. The sub-frame P can also be generated by multiplying the pixel value of the input frame Ft by 0.7. The distribution processing unit 104 then outputs the data of the generated sub-frame P via the switching unit 106.

In other words, the distribution processing unit 104 and the difference processing unit 105 generate the first output frame (i.e., sub-frame Pt−1) and the second output frame (i.e., sub-frame Qt−1) from the first input frame (i.e., input frame Ft−1) based on the first distribution ratio (i.e., Rt−1).

Further, the distribution processing unit 104 and the difference processing unit 105 generate the third output frame (i.e., sub-frame Pt) and the fourth output frame (i.e., sub-frame Qt) from the second input frame (i.e., input frame Ft) based on the first distribution ratio (i.e., Rt).

The switching unit 106 switches the output alternately so that the sub-frame P and the sub-frame Q are sequentially output. As described above, the sub-frames generated from the input frame Ft are output in the order of the sub-frame Pt and the sub-frame Qt. Further, the sub-frame Pt+1 and the sub-frame Qt+1 generated from the input frame Ft+1 are sequentially output after the sub-frame Qt.

Furthermore, in the present exemplary embodiment, the sum of the pixel values of the plurality of sub-frames generated from one input frame equals the pixel value of the input frame. For example, the sum of the pixel values of the sub-frame Pt and the sub-frame Qt is equal to the pixel value of the input frame Ft.

However, the sum of the signal values of the sub-frames can be made different from the signal value of the input frame by including a signal conversion function in the difference processing unit 105.

The process performed in the present exemplary embodiment will be described below with reference to FIG. 2.

Figure 2:
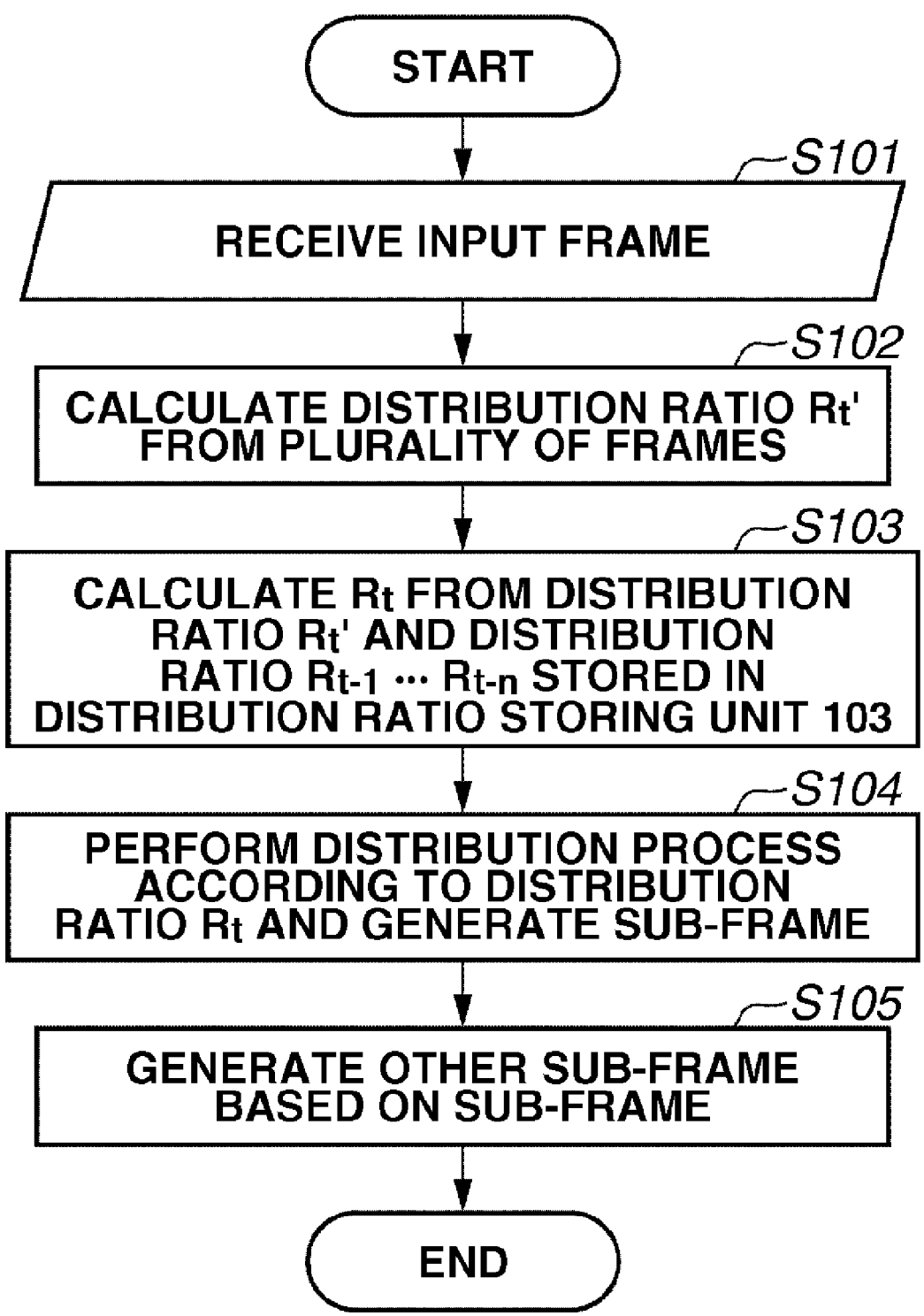
FIG. 2 is a flowchart illustrating a process performed by the moving image processing apparatus according to the first exemplary embodiment of the present invention.

FIG. 2 is a flowchart illustrating a process performed by the moving image processing apparatus according to the present exemplary embodiment. The present exemplary embodiment describes a process performed when the components illustrated in FIG. 1 are configured by hardware. However, the process illustrated in FIG. 2 can also be realized by a central processing unit (CPU) that controls the entire moving image processing apparatus by reading out from a random access memory (RAM) and executing as appropriate a program according to the present exemplary embodiment.

The process illustrated in FIG. 2 is started by the user switching on a power source of the display apparatus such as the digital television (TV). Alternatively, the process can be performed by setting a mode in which double speed driving is executed in the display apparatus.

In step S101 (i.e., an input step), a plurality of input frames is input to the distribution ratio calculation unit 101 from the moving image input apparatus. In the example, the input frames Ft and Ft+1 are input. Three or more input frames can also be input. After the plurality of input frames is input to the distribution ratio calculation unit 101, the process proceeds to step S102.

In step S102, the distribution ratio calculation unit 101 calculates the distribution ratio Rt' from the plurality of input frames (Ft and Ft+1) received in step S101. As described above, the distribution ratio calculation unit 101 calculates the distribution ratio Rt' of the input frame Ft according to the motion amount in the input frame Ft, which is detected from the difference between the input frames Ft and Ft+1.

Further, in step S102, the distribution ratio calculation unit 101 determines the motion of the image inside the second input frame (Ft) based on a displacement amount of the moving region detected from the difference between the third input frame (Ft+1) following the second input frame and the second input frame.

However, the motion of the image inside the frame can be detected from the frame subsequent to the frame, the frame before the frame, or frames before and subsequent to the frame. Further, the motion amount can be acquired from the motion information such as the motion vector information. In such a case, it is not necessary for the distribution ratio calculation unit 101 to receive the plurality of input frames in step S101.

After the distribution ratio calculation unit 101 outputs to the distribution ratio correction unit 102 the calculated distribution ratio Rt' of the input frame Ft, the process proceeds to step S103. In step S103 (determination step), the distribution ratio correction unit 102 corrects according to the past distribution ratio the distribution ratio Rt' of the input frame Ft, which is output from the distribution ratio calculation unit 101. The distribution ratio correction unit 102 then determines the distribution ratio Rt of the input frame Ft.

More specifically, the distribution ratio correction unit 102 corrects the calculated distribution ratio Rt' so that the difference between the distribution ratio Rt of the input frame Ft and the distribution ratio determined for the past input frame is within a predetermined range. The distribution ratio correction unit 102 thus determines the distribution ratio Rt for generating the corresponding third output frame (sub-frame Pt) and the fourth output frame (sub-frame Qt) from the second input frame (input frame Ft).

The distribution ratio correction unit 102 has previously determined the distribution ratio Rt−1 for generating the corresponding first output frame (sub-frame Pt−1) and the second output frame (sub-frame Qt−1) from the first input frame (input frame Ft−1).

In other words, the distribution ratio correction unit 102 determines the ratio Rt of the image signal that corresponds to the third and the fourth output frames (sub-frames Pt and Qt). The distribution ratio correction unit 102 determines the ratio Rt according to the ratio of the image signals corresponding to the first and second output frames (sub-frames Pt−1 and Qt−1) and the motion of the image inside the second input frame (input frame Ft).

Therefore, the distribution ratio correction unit 102 outputs the corrected distribution ratio Rt to the distribution ratio storing unit 103 and the distribution processing unit 104. The, the process proceeds to step S104. The process of correcting the distribution ratio performed by the distribution ratio correction unit 102 will be described in detail below with reference to FIG. 3.

In step S104 (generation step), the distribution processing unit 104 generates the sub-frame Qt based on the input frame Ft and the distribution ratio Rt output from the distribution ratio correction unit 102. For example, if the corrected distribution ratio Rt of the input frame Ft is 7:3 (0.3), the distribution ratio unit 104 generates the sub-frame Qt whose pixel value is 0.3 times the pixel value of the input frame Ft.

The distribution processing unit 104 then outputs the generated sub-frame Qt to the difference processing unit 105. Further, the sub-frame Qt generated by the distribution processing unit 104 is output to outside the moving image processing apparatus via the switching unit 106.

For example, the display apparatus such as the display or a storage device such as a hard disk drive is an external device. However, the present invention is not limited to these devices.

After the distribution processing unit 104 outputs the sub-frame Qt to the difference processing unit 105, the process proceeds to step S105. In step S105 (generation step), the difference processing unit 105 generates the sub-frame Pt based on the input frame Ft and the sub-frame Qt output from the distribution processing unit 104.

More specifically, the difference processing unit 105 generates the difference between the input frame Ft and the sub-frame Qt as the sub-frame Pt. If the corrected distribution ratio Rt of the input frame Ft is 7:3 (0.3), the sub-frame Pt is generated by multiplying the pixel value of the input frame Ft by 0.7.

The sub-frame Pt generated by the difference processing unit 105 is then output to the outside via the switching unit 106. After the difference processing unit 105 generates the sub-frame Pt, the process returns to step S101. The distribution ratio of the input frame Ft+1 is then determined, and the sub-frames Pt+1 and Qt+1 are generated and output, based on the input frames Ft+1 and Ft+2.

Figure 3:
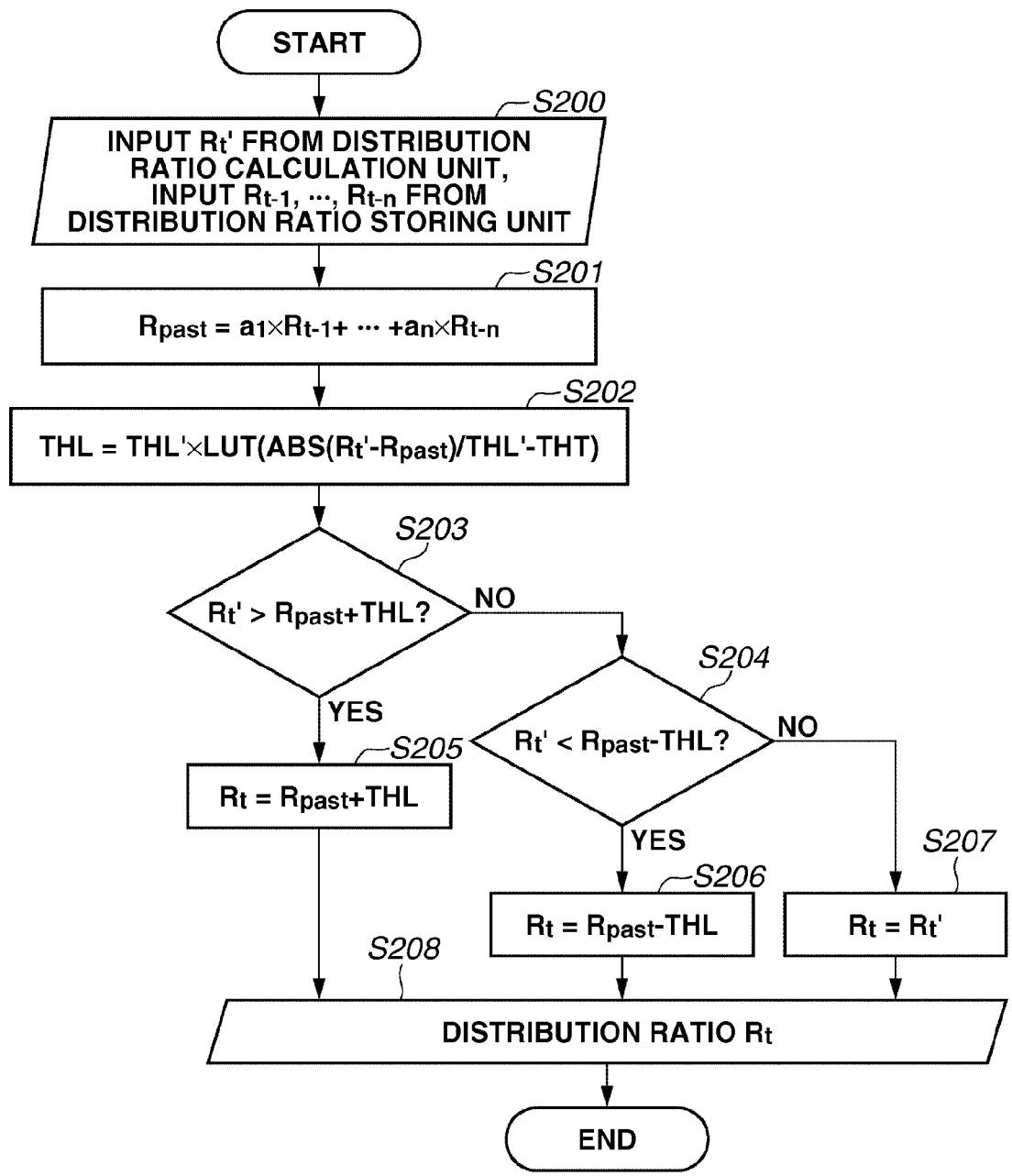
FIG. 3 is a flowchart illustrating a process performed by a distribution ratio correction unit according to the first exemplary embodiment of the present invention.

The process of correcting the distribution ratio will be described below with reference to FIG. 3. FIG. 3 is a flowchart illustrating the process of correcting the distribution ratio R' performed by the distribution ratio correction unit 102. The process of FIG. 3 corresponds to the process performed in step S103 illustrated in FIG. 2.

In the present exemplary embodiment, the case where the distribution ratio Rt' of the input frame Ft is corrected will be described.

As described above, in the present exemplary embodiment, the distribution ratio is expressed based on the ratio between the pixel values of the sub-frame Q and the input frame F. For example, if the distribution ratio of the input frame St is 7:3, the pixel value of the sub-frame Pt is 0.7 times the pixel value of the input frame Ft and the pixel value of the sub-frame Qt is 0.3 times the pixel value of the input frame Ft. The distribution ratio is thus indicated as 0.3.

Further, in the present exemplary embodiment, the distribution ratio of the sub-frames is determined so that the pixel value of the sub-frame P becomes higher than the pixel value of the sub-frame Q. Furthermore, in the present exemplary embodiment, the distribution ratio of 0.2 is higher than the distribution ratio of 0.1. In other words, the pixel values of the sub-frames P and Q become closer when the distribution ratio becomes higher.

In step S200, the distribution ratio correction unit 102 acquires the distribution ratio Rt' of the input frame Ft from the distribution ratio calculation unit 101. The distribution ratio correction unit 102 also acquires the past distribution ratio Rt−1 from the distribution ratio storing unit 103.

The distribution ratio Rt−1 is the distribution ratio of the input frame Ft−1 that is input previous to the input frame Ft, corrected by the distribution ratio correction unit 102. The distribution ratio storing unit 103 thus stores the distribution ratio data used in generating the sub-frames to be actually reproduced.

In the present exemplary embodiment, the distribution ratio correction unit 102 only acquires the corrected distribution ratio of the input frame Ft−1. However, the distribution ratio correction unit 102 can acquire a plurality of the past distribution ratios. For example, the distribution ratio correction unit 102 can collectively acquire the distribution ratio Rt−2 of the input frame Ft−2 and the distribution ratio Rt−3 of the input frame Ft−3.

After the distribution ratio correction unit 102 acquires the distribution ratio Rt' and the previous distribution ratio Rt−1, the process proceeds to step S201. In step S201, the distribution ratio correction unit 102 calculates a past distribution ratio Rpast. In the present exemplary embodiment, since the distribution ratio correction unit 102 only acquires the distribution ratio Rt−1 of the input frame Ft−1 in step S200, Rpast becomes the same value as Rt−1.

However, if the distribution ratio correction unit 102 acquires the distribution ratios of a plurality of input frames, the distribution ratio correction unit 102 acquires Rpast by weighting each distribution ratio based on the closeness to the input frame Ft in terms of the order of reproduction. For example, Rpast is acquired by setting each of the values of a1 to an illustrated in step S201 so that the sum of a1 to an becomes 1. After the distribution ratio correction unit 102 calculates the past distribution ratio Rpast, the process proceeds to step S202.

In step S202, the distribution ratio correction unit 102 calculates an allowable change amount of the distribution ratio THLt using the distribution ratio Rt', the past distribution ratio Rpast, allowable change time THT, and an assumed allowable change amount THL'. The method of calculating the allowable change amount of the distribution ratio THLt will be described below. The allowable change time THT is a preset value (for example, 2 frames-period).

The distribution ratio correction unit 102 calculates an absolute value of the difference between the calculated distribution ratio Rt' and the past distribution ratio Rpast. As a result, the difference between the distribution ratio Rt' calculated according to the motion amount and the distribution ratio of the past input frame Rpast can be acquired.

The difference between the calculated distribution ratio Rt' and the past distribution ratio Rpast is then divided by the assumed allowable change amount THL'. The minimum number of frames necessary to fill in the difference between the distribution ratio Rt' and the past distribution ratio Rpast can thus be acquired. For example, if the distribution ratio of the input frame Ft calculated based on the motion amount is 0.5 and the distribution ratio of the past input frame Rpast is 0.2, the absolute value of the difference is 0.3.

Further, if the assumed allowable change amount THL' is 0.1, it is necessary for the distribution ratio of the input frame Ft to be between 0.1 and 0.3, according to the above-described allowable change amount THL'. More specifically, it is necessary for the distribution ratio Rt of the input frame Ft to be between values which are 0.1 greater than and 0.1 smaller than the distribution ratio of the past input frame Rpast (0.2), i.e., between 0.1 and 0.3.

Further, when the distribution ratio of the past frame Rpast is incremented by the assumed allowable change amount THT' (0.1), the distribution ratio of the third subsequent input frame (input frame Ft+2) becomes the calculated distribution ratio Rt'.

It can be thus determined whether the calculated distribution ratio Rt can be realized within the allowable change time by subtracting the number of frames corresponding to the allowable change time THT from the calculated minimum number of frames. For example, if the allowable change time THT is two frames-period in the above-described example, it is determined that the distribution ratio Rt' will not be realized within the allowable change time.

In such a case, the distribution ratio correction unit 102 refers to a look up table (LUT) and determines the allowable change amount THL. In other words, the LUT outputs "1" if the distribution ratio Rt' is realized within the allowable change time THT when the distribution ratio is changed by the assumed allowable change amount THL'. The assumed allowable change amount THL' is thus set as the allowable change amount THL.

On the other hand, the LUT outputs a value greater than 1 if the distribution ratio Rt' is not realized within the allowable change time THT when the distribution ratio is changed within the range indicated by the assumed allowable change amount THL'.

The allowable change amount THL is a product of the assumed allowable change amount and the output value of the LUT. As a result, the allowable change amount THL becomes a value greater than the assumed allowable change amount THL'. More specifically, the distribution ratio correction unit 102 determines whether to prioritize the allowable change amount or the allowable change time using the LUT. If the LUT outputs a value greater than 1, the assumed allowable change amount THL' is neglected.

Prioritizing either the allowable change amount or the allowable change time can be determined based on the user setting. For example, if a setting is specified to suppress a change in the brightness of the display screen due to a drastic change in the distribution ratio, the LUT can output "1" even when the distribution ratio Rt' cannot be realized within the allowable change time THT. The distribution ratio correction unit 102 of the present exemplary embodiment thus determines whether to prioritize the allowable change amount or the allowable change time based on the LUT.

After the distribution ratio correction unit 102 calculates the allowable change amount THLt of the distribution ratio, the process proceeds to step S203. In step S203, the distribution ratio correction unit 102 compares the sum of the past distribution ratio Rpast and the allowable change amount THLt calculated in step S201 with the distribution ratio Rt' calculated by the distribution ratio calculation unit 101.

More specifically, the distribution ratio correction unit 102 determines whether the distribution ratio Rt' is greater than the sum of the past distribution ratio Rpast and the allowable change amount THLt. If the distribution ratio Rt' is greater than the sum of the past distribution ratio Rpast and the allowable change amount THLt (YES in step S203), the process proceeds to step S205. On the other hand, if the distribution ratio Rt' is less than or equal to the sum of the past distribution ratio Rpast and the allowable change amount THLt (NO in step S203), the process proceeds to step S204.

In step S205, the distribution ratio correction unit 102 sets the sum of the past distribution ratio Rpast and the allowable change amount THLt as the corrected distribution ratio Rt of the input frame Ft. In other words, if the distribution ratio Rt' calculated by the distribution ratio calculation unit 101 is determined to be greater than the sum of the past distribution ratio Rpast and the allowable change amount THLt, the corrected distribution ratio Rt is determined as described below.

The distribution ratio correction unit 102 corrects the distribution ratio Rt' to be the highest distribution ratio within the allowable change amount and thus determines the distribution ratio Rt. After the distribution ratio correction unit 102 determines the distribution ratio Rt, the process proceeds to step S208.

On the other hand, in step S204, the distribution ratio correction unit 102 compares the difference between the past distribution ratio Rpast and the allowable change amount THLt calculated in step S201 with the distribution ratio Rt' calculated by the distribution ratio calculation unit 101. The distribution ratio correction unit 102 thus determines whether the distribution ratio Rt' is less than the difference between the past distribution ratio Rpast and the allowable change amount THLt.

If it is determined that the distribution ratio Rt' is less than the difference between the past distribution ratio Rpast and the allowable change amount THLt (YES in step S204), the process proceeds to step S206. If it is determined that the distribution ratio Rt' is greater than or equal to the difference between the past distribution ratio Rpast and the allowable change amount THLt (NO in step S204), the process proceeds to step S207.

In step S206, the distribution ratio correction unit 102 sets the difference between the past distribution ratio Rpast and the allowable change amount THLt as the corrected distribution ratio Rt of the input frame Ft.

More specifically, if it is determined that the distribution ratio Rt' calculated by the distribution ratio calculation unit 101 is less than the difference between the past distribution ratio Rpast and the allowable change amount THLt (YES in step S204), the distribution ratio Rt is determined as described below.

The distribution ratio correction unit 102 corrects the distribution ratio Rt' to be the lowest distribution ratio within the allowable change amount and thus determines the distribution ratio Rt. After the corrected distribution ratio Rt is determined, the process proceeds to step S208.

In step S207, the distribution ratio correction unit 102 determines the distribution ratio Rt' as the corrected distribution ratio Rt. The distribution ratio correction unit 102 thus does not correct the distribution ratio Rt' calculated by the distribution ratio calculation unit 101.

As described above, the distribution ratio correction unit 102 in the present exemplary embodiment does not correct the distribution ratio when the distribution ratio Rt' calculated by the distribution ratio calculation unit 101 is within the allowable change amount of the past distribution ratio Rpast. After the distribution ratio is determined, the process proceeds to step S208.

As a result, in step S204 to step S207, the distribution ratio correction unit 102 determines the ratio (i.e., a second ratio) of the image signal corresponding to the third output frame (sub-frame Pt) to the image signal corresponding to the fourth output frame (sub-frame Qt) as described below.

The distribution ratio correction unit 102 determines the distribution ratio Rt so that the difference between the ratio of the image signal corresponding to the first output frame to the image signal corresponding to the second output frame (i.e., the first ratio) and the second ratio is less than or equal to a predetermined value. The first output frame corresponds to the sub-frame Pt−1 and the second output frame corresponds to the sub-frame Qt−1.

Further, the distribution ratio calculation unit 101 sets an allowable range of the ratio between the image signals corresponding to the third output frame (sub-frame Pt) and the fourth output frame (sub-frame Qt). This is set based on the ratio between the image signals corresponding to the first output frame (sub-frame Pt−1) and the second output frame (sub-frame Qt−1).

In the present exemplary embodiment, the allowable range is from Rpast−THL to Rpast+THL. The distribution ratio correction unit 102 then calculates the ratio between the image signals corresponding to the third output frame and the fourth output frame according to the set allowable range and the motion of the image in the second input frame (input frame Ft).

Further, the distribution ratio calculation unit 101 calculates the distribution ratio Rt' so that the difference between the sub-frames Pt and Qt increases as the motion amount of the image in the input frame Ft increases. Therefore, the distribution ratio correction unit 102 also determines the distribution ratio Rt so that the difference between the sub-frame Pt and the sub-frame Qt becomes greater when the motion amount inside the input frame St is greater.

More specifically, when the motion in the second input frame (input frame St) is of a first amount, the distribution ratio correction unit 102 determines the distribution ratio between the image signals of the third output frame (sub-frame Pt) and the fourth output frame (sub-frame Qt) as described below.

The distribution ratio correction unit 102 determines the difference between the image signals of the third output frame and the fourth output frame to be greater than the difference of between the image signals of the third output frame and the fourth output frame determined when the motion in the second input frame is of a second amount which is smaller than the first amount.

The third output frame and the fourth output frame are sub-frames generated from the second input frame (input frame Ft). Further, the fourth output frame (sub-frame Qt) is an output frame reproduced after the third output frame (sub-frame Pt).

In step S208, the distribution ratio correction unit 102 outputs the determined distribution ratio Rt to the distribution ratio storing unit 103 and the distribution processing unit 104. The process for correcting the distribution ratio thus ends.

Figure 5:
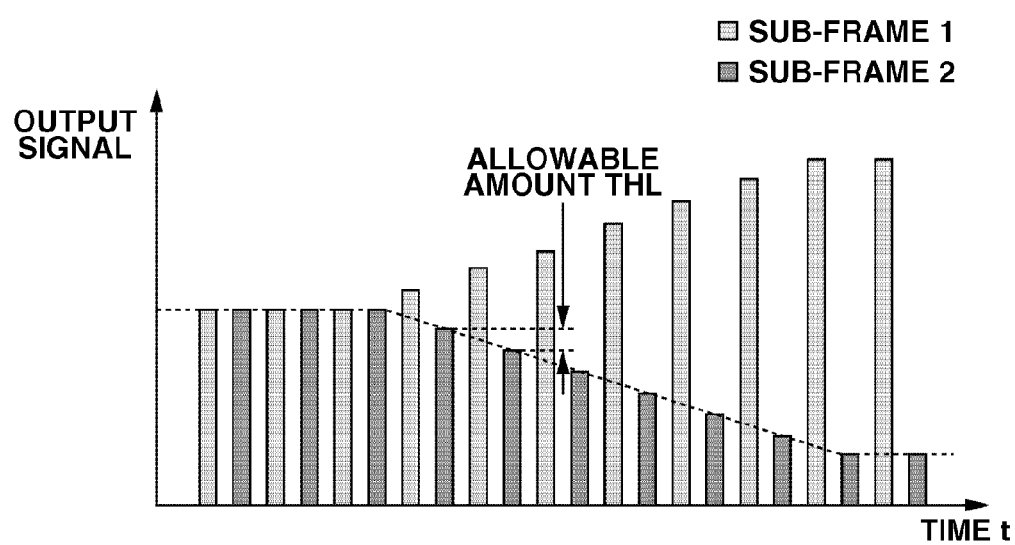
FIG. 5 illustrates a first example of an output according to the corrected distribution ratio.
Figure 6:
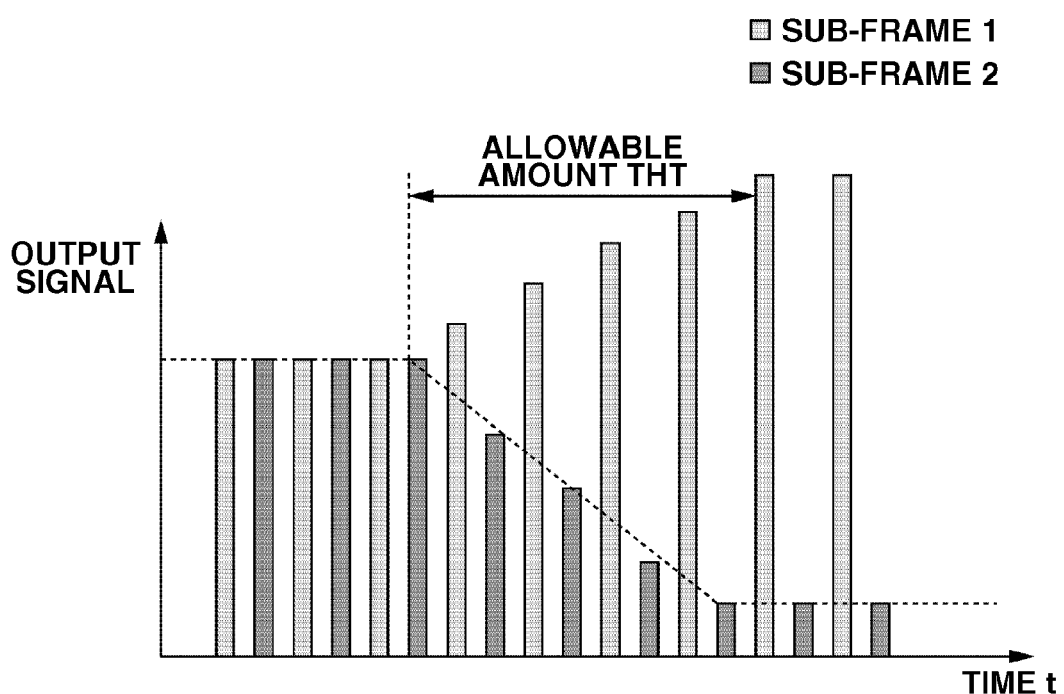
FIG. 6 illustrates a second example of an output according to the corrected distribution ratio.

FIGS. 5 and 6 illustrate the changes in the distribution ratios based on the distribution ratio R corrected by performing the above-described process. Referring to FIG. 5, the change amount between the corrected distribution ratio and the distribution ratio of the previous input frame is less than or equal to the allowable change amount THL.

Referring to FIG. 6, the distribution ratio Rt' calculated by the distribution ratio calculation unit 101 becomes the distribution ratio of the input frames within the number of frames indicated by the allowable change time THT.

More specifically, the distribution ratio correction unit 102 gradually changes the distribution ratio, so that the distribution ratio Rt' is realized within the allowable change time THL. The distribution ratio Rt' is realized even when the distribution ratio Rt' calculated by the distribution ratio calculation unit 101 exceeds the range of the allowable change amount THL from the past distribution ratio.

However, depending on the distribution ratio Rt' and the allowable change amount THL, there is a case where only one of the conditions can be satisfied. In such a case, the distribution ratio correction unit 102 determines which condition is to be prioritized based on the LUT.

As described in step S202, whether to prioritize the allowable change amount or the allowable change time is determined based on the user setting. For example, if a setting is specified to suppress the change in the brightness of the display screen due to a drastic change in the distribution ratio, the LUT can output 1 even when the distribution ratio Rt' is not realized within the allowable change time THT. In other words, the maximum value of the LUT output is set to 1.

On the other hand, if the setting is specified to prioritize the allowable change time, the maximum value of the LUT output is set to be greater than 1 to realize the distribution ratio Rt' within the allowable change time. As described above, the distribution ratio correction unit 102 in the present exemplary embodiment determines whether to prioritize the allowable change amount or the allowable change time based on the LUT.

Figure 7:
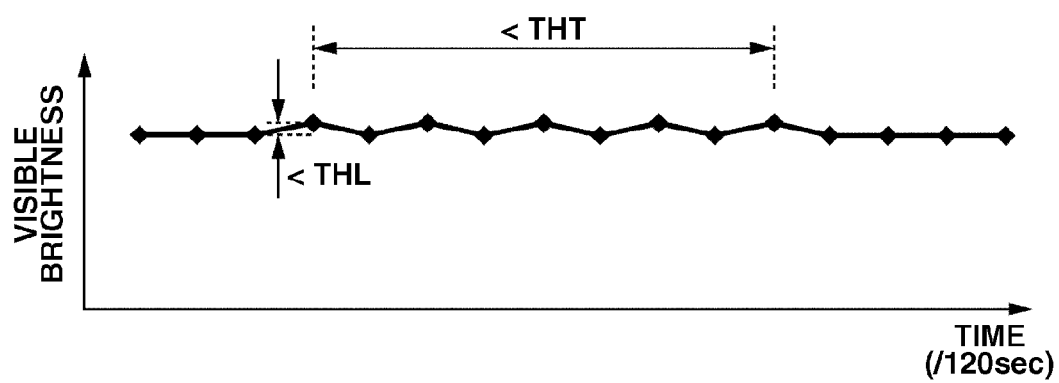
FIG. 7 illustrates an example of a brightness of the screen when the user views the output according to the corrected distribution ratio.

Further, FIG. 7 illustrates an example of a change in the visible brightness on the display screen when the distribution ratio is corrected as illustrated in FIG. 6. Referring to FIG. 7, the change in the visible brightness is less than or equal to the allowable change amount THL.

Figure 17:
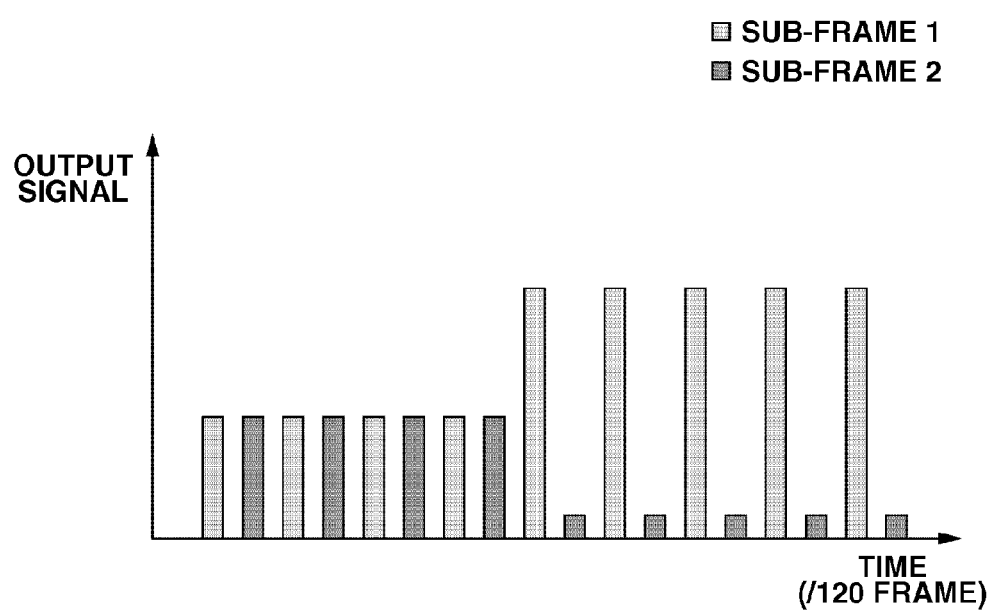
FIG. 17 illustrates an example of an output of the sub-frame according to the distribution ratio determined based on a motion amount.

In contrast, if the distribution ratio is not corrected as illustrated in FIG. 17, the viewer recognizes that the brightness has drastically changed when the distribution ratio drastically changes. The reason for this is that the viewer recognizes that the display is bright when the sum of the brightness of the continuously reproduced sub-frames is high.

In the example of FIG. 17, there is no change in the brightness of the screen due to the change in the distribution ratio up to when the eighth sub-frame is displayed. However, when the ninth sub-frame is displayed, the viewer recognizes that the screen has suddenly become bright when the sum of the brightness of the eighth and the ninth sub-frames has become greater than the sum of the brightness of the continuously reproduced sub-frames.

Figure 18:
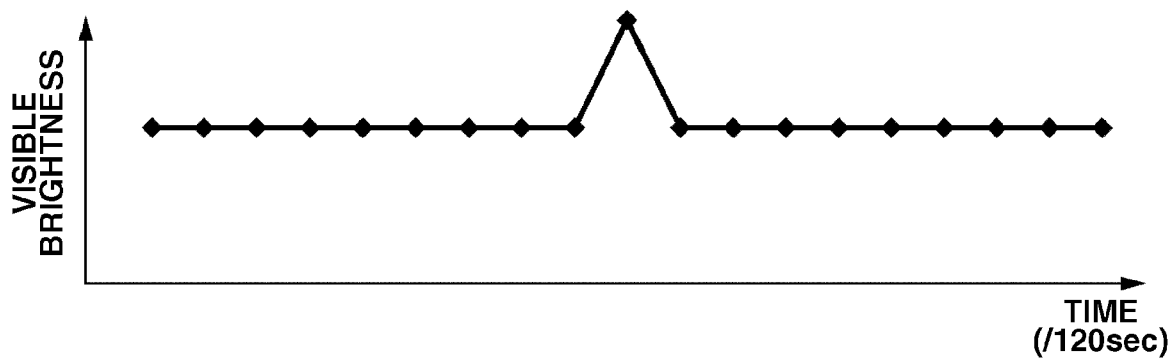
FIG. 18 illustrates an example of a brightness of the screen when the user views the output of the sub-frame according to the distribution ratio determined based on the motion amount.

FIG. 18 illustrates an example of a change in the brightness of the display screen when the distribution ratio is changed as illustrated in FIG. 17.

As described above, the distribution ratio is controlled for each frame.

A case where the distribution ratio is controlled for each region in the frame will be described below with reference to FIG. 4.

Figure 4:
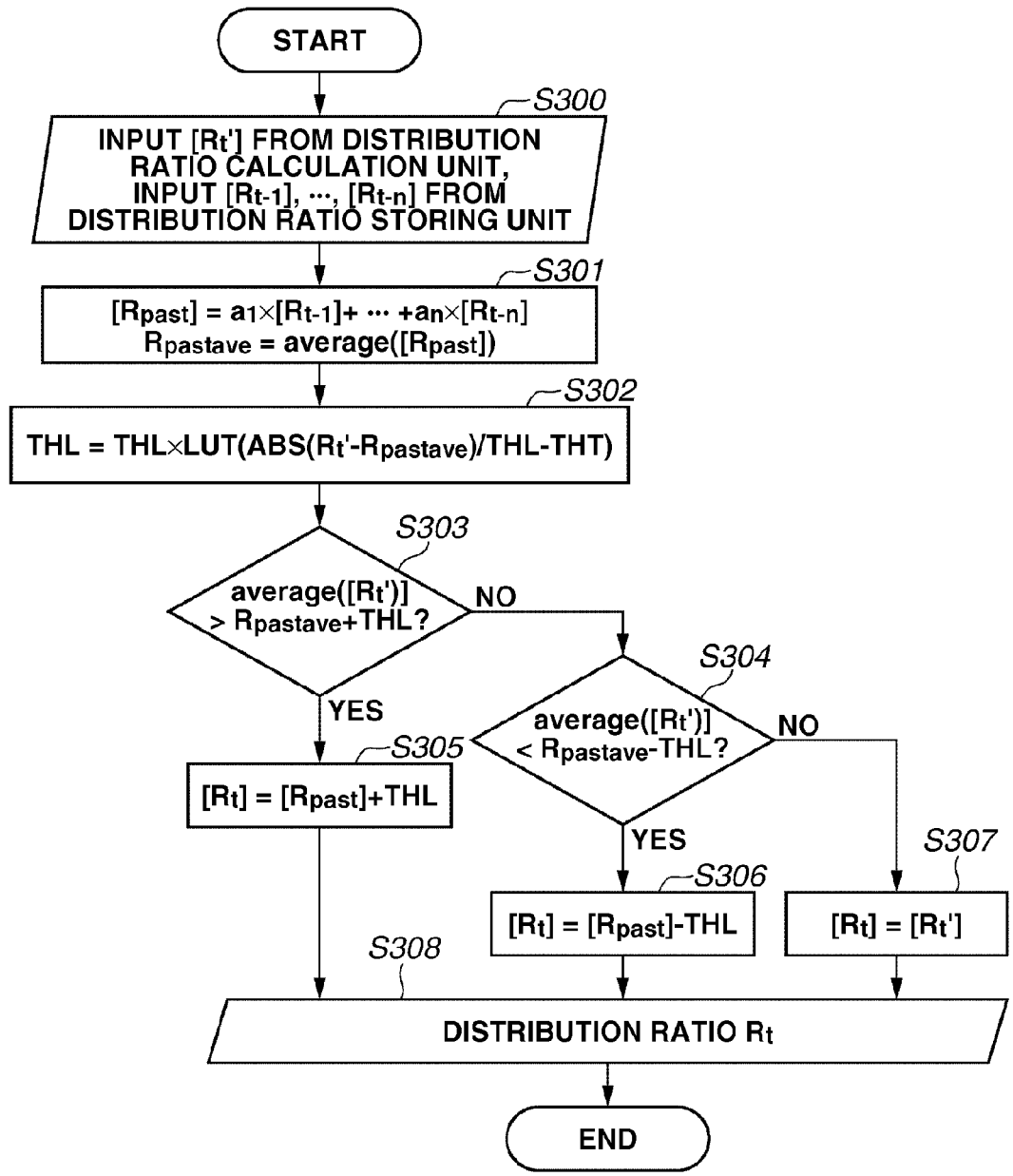
FIG. 4 is a flowchart illustrating a process of setting the distribution ratio for each region according to the first exemplary embodiment of the present invention.

FIG. 4 is a flowchart illustrating a process performed by the distribution ratio correction unit 102 when controlling the distribution ratio for each region. In the present exemplary embodiment, the distribution ratio correction unit 102 receives from the distribution ratio calculation unit 101 a distribution ratio [Rt'] for each region of the input frame Ft. The distribution ratio correction unit 102 then outputs the corrected distribution ratio [Rt] to the distribution ratio storing unit 103 and the distribution processing unit 104.

The process illustrated in FIG. 4 is started by the user by instructing a mode for setting the distribution ratio for each region. However, the process can also be started along with the start of reproducing the video image.

In step S300, the distribution ratio correction unit 102 receives from the distribution ratio calculation unit 101 the distribution ratio [Rt'] for each region of the input frame Ft. The distribution ratio correction unit 102 also receives from the distribution ratio storing unit 103 a distribution ratio [Rt−1] for each region of the past input frame Ft−1.

The past distribution ratio [Rt−1] for each region is a corrected distribution ratio. Further, the distribution ratio calculation unit 101 of the present exemplar embodiment calculates the distribution ratio [Rt'] for each region according to the motion amount in the region. In other words, the distribution ratio calculation unit 101 determines whether there is a moving region in the region by calculating the difference between the region in the input frame Ft and the region corresponding to the input frame Ft+1.

If the distribution ratio calculation unit 101 determines that there is a moving region, the distribution ratio calculation unit 101 acquires the motion amount of the moving region. The distribution ratio calculation unit 101 then calculates the distribution ratio of the region in the input frame Ft based on the motion amount of the moving region. The distribution ratio correction unit 102 thus receives from the distribution ratio calculation unit 101 the distribution ratio [Rt'] for each region of the input frame Ft calculated as described above.

In step S301, the distribution ratio correction unit 102 calculates an average value of the past distribution ratio, i.e., Rpastave.

More specifically, the distribution ratio correction unit 102 calculates a past distribution ratio [Rpast] for each region when using the distribution ratio for each region of the plurality of input frames as the past distribution ratio. [Rpast] is calculated using an equation described in the first line of step S301. The distribution ratio correction unit 102 can calculate [Rpast] by setting a value to "a" so that the distribution ratio is weighted higher based on the closeness to the input frame Ft in terms of the reproduction order.

However, in the present exemplary embodiment, the distribution ratio [Rt−1] of the input frame Ft−1, which is input one frame before the input frame Ft, is used as the past distribution ratio. [Rt−1] thus directly becomes [Rpast].

Further, in step S301, the distribution ratio correction unit 102 calculates Rpastave from the average value of the past distribution ratio [Rpast] for each region. The process then proceeds to step S302.

In step S302, the distribution ratio correction unit 102 calculates the allowable change amount THLt of the distribution ratio. The distribution ratio correction unit 102 calculates based on a distribution ratio Rt'ave, the past distribution ratio Rpastave calculated in step S301, the allowable change time THT, and the assumed allowable change amount THL'.

Rt'ave is an average value of the distribution ratio [Rt'] calculated for each region. Further, the distribution ratio correction unit 102 calculates the allowable change amount THL similarly as in step S202 illustrated in FIG. 3. More specifically, the distribution ratio correction unit 102 calculates the absolute value of the difference between the calculated distribution ratio Rt' and the past distribution ratio Rpastave.

The distribution ratio correction unit 102 then divides the difference by the assumed change amount THL' and calculates the minimum number of frames necessary to fill the difference between the distribution ratio Rt' and the distribution ratio Rpastave.

The distribution ratio correction unit 102 calculates the difference between the calculated minimum number of frames and the number of frames indicated by the allowable change time THT. The distribution ratio correction unit 102 then inputs the difference to the LUT and determines the allowable change amount THL. After the distribution ratio correction unit 102 calculates the allowable change amount THLt of the distribution ratio, the process proceeds to step S303.

In step S303, the distribution ratio correction unit 102 compares the sum of the past distribution ratio Rpastave and the allowable change amount THL calculated in step S302 with the average value of the distribution ratio Rt'ave of the input frame Ft.

In other words, the distribution ratio correction unit 102 determines whether the average value of the distribution ratio Rt'ave is greater than the sum of the past distribution ratio Rpastave and the allowable change amount THL.

If the distribution ratio correction unit 102 determines that the average value of the distribution ratio Rt'ave is greater than the sum of the past distribution ratio Rpastave and the allowable change amount THL (YES in step S303), the process proceeds to step S305.

On the other hand, if the distribution ratio correction unit 102 determines that the average value of the distribution ratio Rt'ave is less than or equal to the sum of the past distribution ratio Rpastave and the allowable change amount THL (NO in step S303), the process proceeds to step S304.

In step S305, the distribution ratio correction unit 102 sets the sum of the past distribution ratio [Rpast] for each region and the allowable change amount THL as the distribution ratio of each region of the input frame Ft, i.e., [Rt].

The distribution ratio correction unit 102 thus determines the distribution ratio [Rt] as described below when it is determined that the average value of the distribution ratio Rt'ave is greater than the sum of the past distribution ratio Rpastave and the allowable change amount THL. The distribution ratio correction unit 102 determines the distribution ratio for each region [Rt] to be the highest distribution ratio within the allowable change amount of the past distribution ratio of the region corresponding to each region in the frame Ft.

For example, Rt'(1) is corrected so that the corrected distribution ratio Rt(1) of a region (i.e., first region) in the frame Ft becomes the highest distribution ratio within the allowable change amount. After the distribution ratio correction unit 102 corrects the distribution ratio Rt' for all regions in the frame Ft and determines the distribution ratio [Rt], the process proceeds to step S308.

On the other hand, in step S304, the distribution ratio correction unit 102 compares the difference between the past distribution ratio Rpastave and the allowable change amount THL calculated in step S302 with Rt'ave, i.e., the calculated average value of the distribution ratio [Rt'], of the input frame St.

If the distribution ratio correction unit 102 determines that the distribution ratio Rt'ave is less than the difference between the distribution ratio Rpastave and the allowable change amount THL (YES in step S304), the process proceeds to step S306.

On the other hand, if the distribution ratio correction unit 102 determines that the distribution ratio Rt'ave is greater than or equal to the difference between the distribution ratio Rpastave and the allowable change amount THL (NO in step S304), the process proceeds to step S307.

In step S306, the distribution ratio correction unit 102 sets the difference between the distribution ratio Rpastave and the allowable change amount THL as the distribution ratio [Rt] of each region in the input frame Ft.

The distribution ratio correction unit 102 determines the distribution ratio [Rt] as described below when the average value of the distribution ratios of the input frame calculated for each region is less than the difference between the distribution ratio Rpastave and the allowable change amount THL. The distribution ratio correction unit 102 determines the distribution ratio [Rt] for each region to be the lowest distribution ratio within the allowable change amount of the past distribution ratio of the region corresponding to each region in the input frame Ft.

For example, the distribution ratio correction unit 102 corrects Rt'(1) so that the corrected distribution ratio Rt(1) of a region (i.e., a first region) in the frame Ft becomes the lowest distribution ratio within the allowable change amount.

After the distribution ratio correction unit 102 corrects the distribution ratio Rt' for all regions in the frame Ft and determines the distribution ratio [Rt], the process proceeds to step S308.

On the other hand, in step S307, the distribution ratio correction unit 102 sets the distribution ratio [Rt'] to the corrected distribution ratio [Rt]. In other words, the distribution ratio correction unit 102 does not correct the distribution ratio [Rt'] calculated by the distribution ratio calculation unit 101.

The distribution ratio correction unit 102 thus determines the distribution ratio as [Rt'] if the average of the distribution ratio [Rt'] calculated for each region by the distribution ratio calculation unit 101 is within the range of the allowable change amount of Rpastave, i.e., the average of the past distribution ratio of each region. After the distribution ratio correction unit 102 of the present exemplary embodiment determines the distribution ratio [Rt] as described above, the process proceeds to step S308.

As described above, the distribution ratio correction unit 102 determines the distribution ratio of the input frame that is input in the past (e.g., the input frame Ft−1) for each region. The distribution ratio correction unit 102 then determines the distribution ratio [Rt] for each region in the input frame Ft according to the determined distribution ratio [Rt−1] for each region as described in step S303 to step S307.

In other words, the distribution ratio correction unit 102 determines the distribution ratio of the first output frame (sub-frame Pt−1) and the second output frame (i.e., sub-frame Qt−1) for each region. The distribution ratio correction unit 102 then determines the distribution ratio of the image signals corresponding to the third output frame (i.e., sub-frame Pt) and the image signal corresponding to the fourth output frame (sub-frame Qt) for each region according to the distribution ratio determined for each region.

In step S308, the distribution ratio correction unit 102 outputs the determined distribution ratio [Rt] to the distribution ratio storing unit 103 and the distribution processing unit 104. The process of correcting the distribution ratio of the input frame St thus ends.

As described above, the moving image processing apparatus according to the present exemplary embodiment can correct the distribution ratio that is calculated according to the motion amount, based on the distribution ratio of the input frame, which is previously input. The moving image processing apparatus can correct the distribution ratio even when the distribution ratio is to be determined for each region in the input frame.

Further, according to the present exemplary embodiment, the distribution ratio is corrected using the average value of the distribution ratios of the input frames calculated for each region and the average value of the past distribution ratios calculated for each region. As a result, the distribution ratio can be corrected with less computational effort as compared to correcting each of the distribution ratios [S't] calculated for each region using the past distribution ratio [Rpast] for each region.

The distribution ratio can also be corrected by calculating the allowable change amount for each region in the input frame Ft. As a result, for example, the distribution ratio can be controlled more minutely when there are regions in the input frame Ft including a great change in the motion amount and a small change in the motion amount respectively.

Further, a low pass filter (LPF) 108 can be added to the moving image processing apparatus illustrated in FIG. 1. The LPF 108 is a filter, which only passes the low frequency component of the video signal. The LPF 108 thus removes the high frequency component, which tends to become noise.

The LPF 108 can be placed between the moving image input apparatus and the distribution processing unit 104 to remove the high frequency component from the signals of the input frames input to the distribution processing unit 104. In such a case, the output of each sub-frame becomes as illustrated in FIG. 16.

Figure 14:
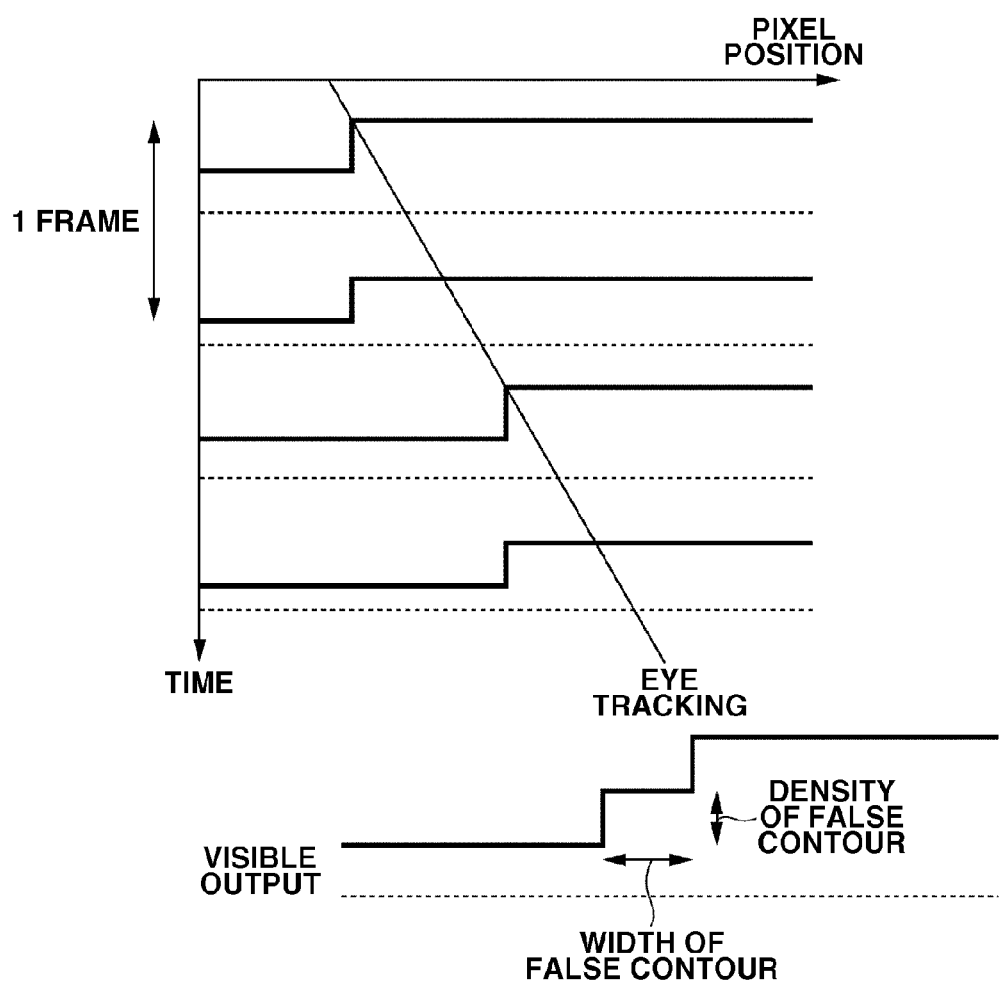
FIG. 14 is an example of a schematic diagram illustrating a display output and a visible output when the distribution ratio is 5:5.
Figure 15:
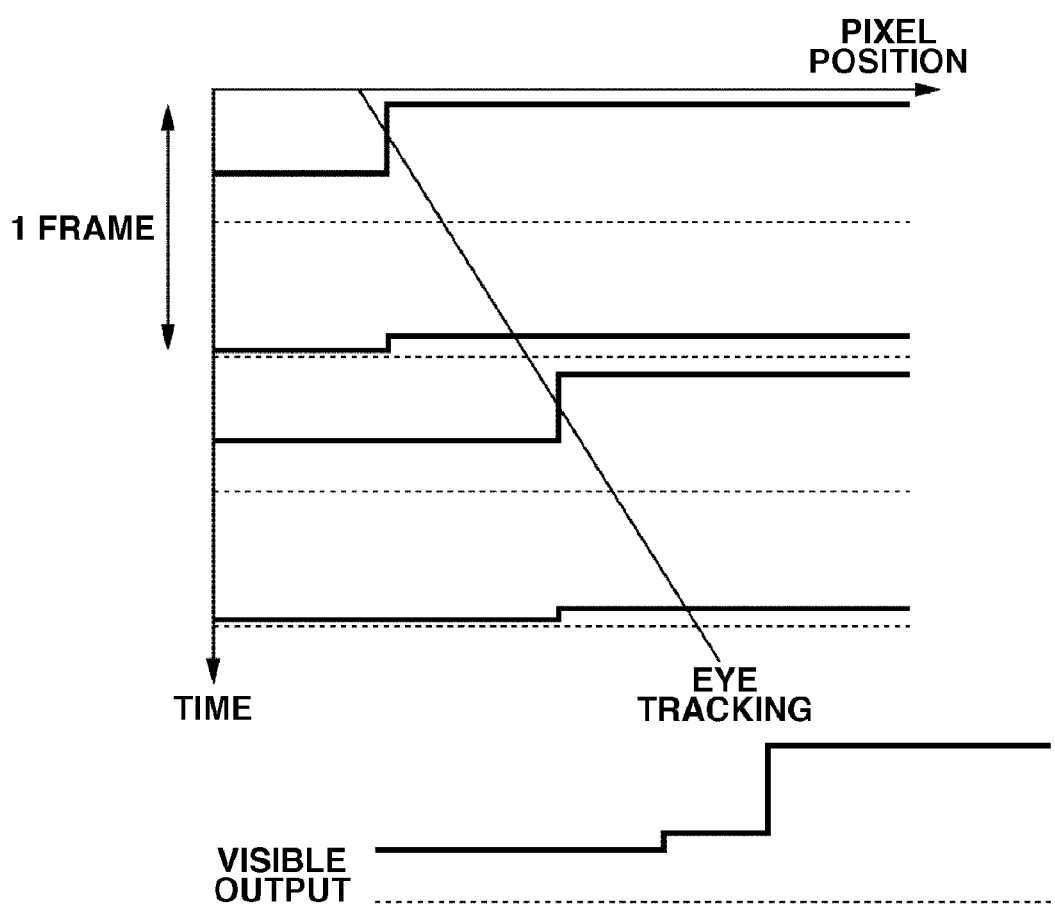
FIG. 15 is an example of a schematic diagram illustrating the display output and the visible output when the distribution ratio is 9:1.

When the LPF 108 is not included, each of the sub-frames is output as illustrated in FIGS. 14 and 15. In the example illustrated in FIG. 14, the difference between the pixel value of each sub-frame generated from the input frame is small as compared with the example illustrated in FIG. 15. The false contour thus becomes conspicuous.

Figure 16:
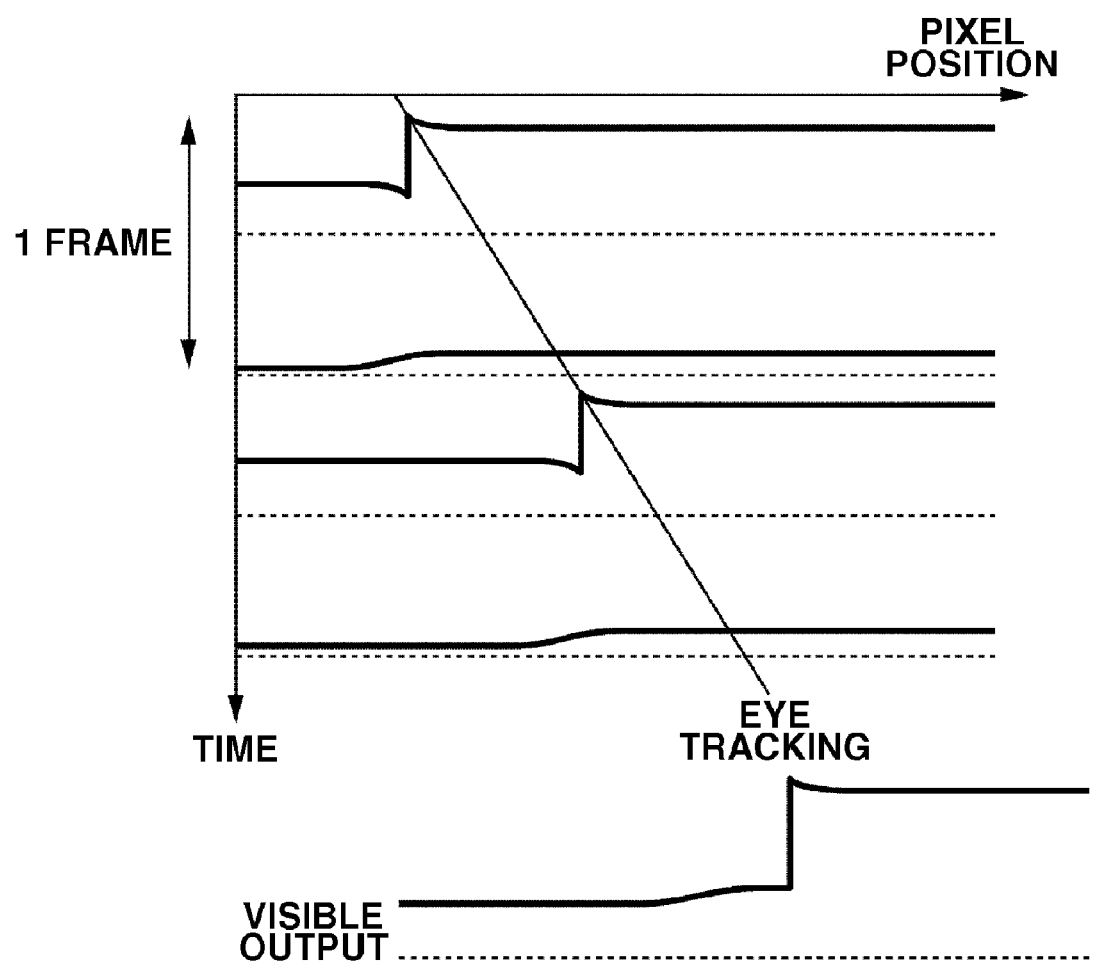
FIG. 16 is an example of a schematic diagram illustrating a display output and a visible output when a low-pass filter (LPF) is included in the configuration.

Further, FIG. 16 illustrates an example of the sub-frame output when the moving image processing apparatus includes the LPF 108, in the case where the distribution ratio of the sub-frame is the same as in FIG. 15.

A sub-frame Q illustrated in FIG. 16 is a frame generated based on frame data acquired by removing the high frequency component from the input frame, which is input to the distribution processing unit 104, and the corrected distribution ratio R. As a result, the sub-frame Q is a sub-frame in which the high frequency component is removed.

Further, the sub-frame P is a frame generated based on the difference between the input frame F and the sub-frame Q. The sub-frame P is thus a sub-frame in which the high frequency component is emphasized. As described above, the false contour generated in the double speed driving can be made less conspicuous by removing the high frequency component of the sub-frame Q.

For example, if the distribution ratio Rt' calculated according to the motion amount becomes greater than the sum of the past distribution ratio and the allowable change amount of the past distribution ratio, the high frequency component of the sub-frame Q can be removed along with correcting the past distribution ratio. As a result, the change in the visible brightness can be suppressed, and the quality of the video image displayed at double speed driving can be improved.

The second exemplary embodiment will be described below by focusing on the difference from the first exemplary embodiment. The second exemplary embodiment describes a case in which the allowable change amount is controlled according to the input frame.

Figure 8:
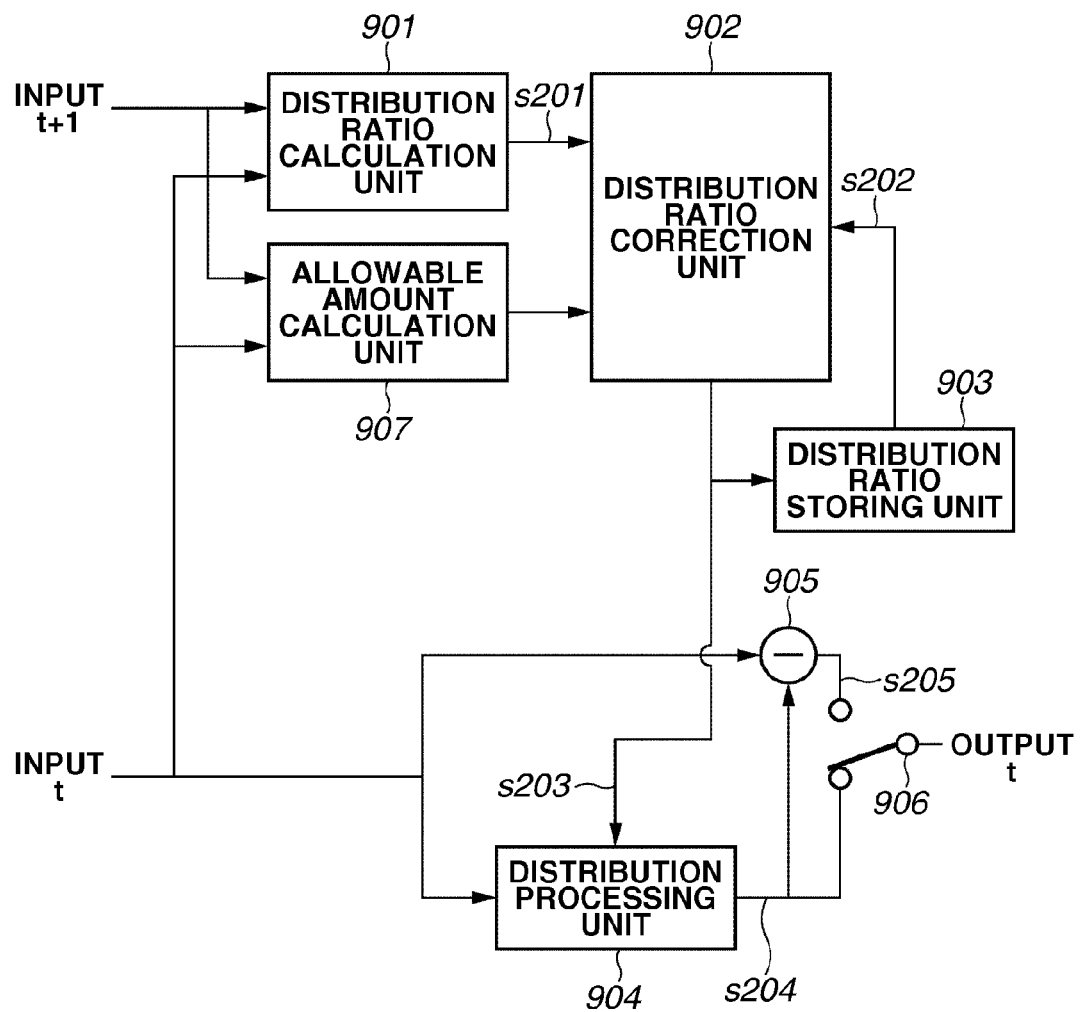
FIG. 8 is a block diagram illustrating the moving image processing apparatus according to a second exemplary embodiment of the present invention.

FIG. 8 is a block diagram illustrating the configuration of the main components of the moving image processing apparatus according to the second exemplary embodiment. The moving image processing apparatus includes a distribution ratio calculation unit 901, an allowable amount calculation unit 907, a distribution ratio correction unit 902, a distribution ratio storing unit 903, a distribution processing unit 904, a difference processing unit 905, and a switching device 906. Redundant description of components similar to the components of the first exemplary embodiment will be omitted.

Further, the present exemplary embodiment describes a case where the frame rate of the input frame (60 frames/second) is converted into the frame rate of the output frame (120/second), similar to the first exemplary embodiment.

The allowable amount calculation unit 907 calculates the allowable change amount of the distribution ratio according to the input frames Ft and Ft+1 input from the outside. The method for calculating the allowable change amount by the allowable amount calculation unit 907 will be described below with reference to FIGS. 11A, 11B, and 11C.

Figure 11A:
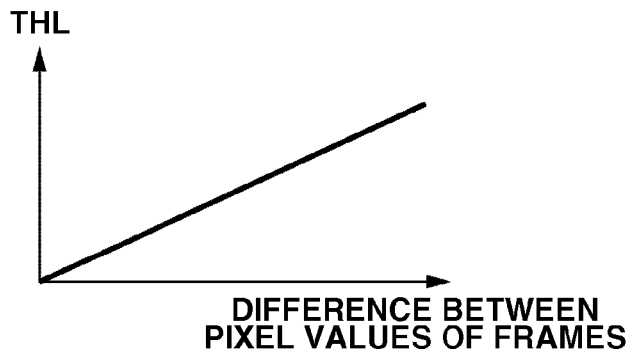
FIGS. 11A, 11B, and 11C illustrate examples of input and output of an allowable amount calculation unit according to the second exemplary embodiment of the present invention.
Figure 11B:
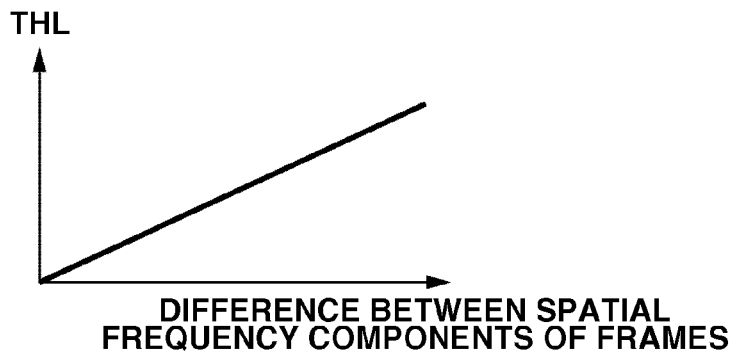
Figure 11C:
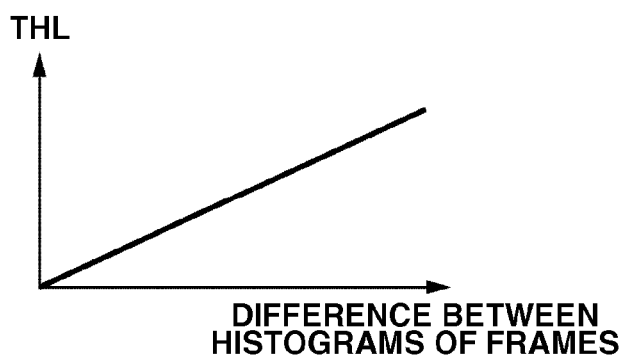

FIGS. 11A, 11B, and 11C illustrate examples of input to and output from the allowable amount calculation unit 907. Referring to FIG. 11A, the allowable amount calculation unit 907 calculates the allowable change amount THL so that the allowable change amount THL increases as the sum of the differences between the pixel values of the plurality of input frames (input frame Ft and input frame Ft+1) increases.

However, the allowable change amount THL can be calculated using a maximum value or an average value of the differences between the pixel values instead of the sum of the differences between the pixel values.

Further, referring to FIG. 11B, the allowable amount calculation unit 907 calculates spatial frequency components from the image signals of the input frame Ft and the input frame Ft+1 respectively. The allowable change amount calculation unit 907 then calculates the allowable change amount so that the allowable change amount THL increases as the sum of the differences between the calculated spatial frequency components increases. The allowable change amount THL can also be calculated using a maximum value or an average value of the differences between the pixel values instead of the sum of the differences between the pixel values.

Further, referring to FIG. 11C, the allowable amount calculation unit 907 calculates the allowable change amount so that the allowable change amount THL increase as the sum of the differences between the numbers of degrees indicated by the respective histogram of the input frame FT and the input frame Ft+1 increases. The allowable change amount THL can also be calculated using a maximum value or an average value of the differences between the numbers of degrees instead of the sum of the differences between the numbers of degrees.

When the difference between the plurality of input frames is large, it is most likely that the image is changing in the entire display screen. In such a case, a change in the scene may be generated.

If the entire display screen is changing as described above, the user becomes less sensitive to the change in the brightness of the screen. More specifically, when the entire display screen is not changing, the user can easily recognize the drastic change in the screen brightness even if the motion amount of the moving region on the display screen is great. However, it becomes difficult for the user to recognize the change in the screen brightness when there is a great change in the entire display screen.

The allowable amount calculation unit 907 in the present exemplary embodiment thus calculates the allowable change amount THL so that the allowable change amount THL increases as the difference between the frames increases.

In the example illustrated in FIG. 11A, the allowable change amount THL is calculated according to the difference between the pixel values of the input frames. The allowable change amount can thus be calculated with less effort as compared to calculating the difference in the spatial frequency components or the histograms.

Further, the allowable change amount THL can be calculated according to the amount of the difference between the spatial frequency components or the histograms of the input frames. As a result, it can prevent the allowable change amount to be calculated as a large value when the screen is slowly moving due to panning or tilting.

Furthermore, the allowable change amount can be calculated using one of the differences between the pixel values, the spatial frequency components, and the histograms, or a combination of a plurality of difference information.

For example, the spatial frequency component may be compared only when there is a great difference between the pixel values of the input frames. The generation of a change in the scene can then be accurately estimated with less computational effort.

The distribution ratio correction unit 902 corrects the distribution ratio Rt' based on the distribution ratio Rt' calculated by the distribution ratio calculation unit 901, the allowable change time THL calculated by the allowable amount calculation unit 907, and the past distribution ratio Rt−1 stored by the distribution ratio storing unit 903. The process of correcting the distribution ratio performed by the distribution ratio correction unit 902 will be described below with reference to FIG. 10.

The process performed by the moving image processing apparatus according to the present exemplary embodiment will be described below with reference to FIG. 9.

Figure 9:
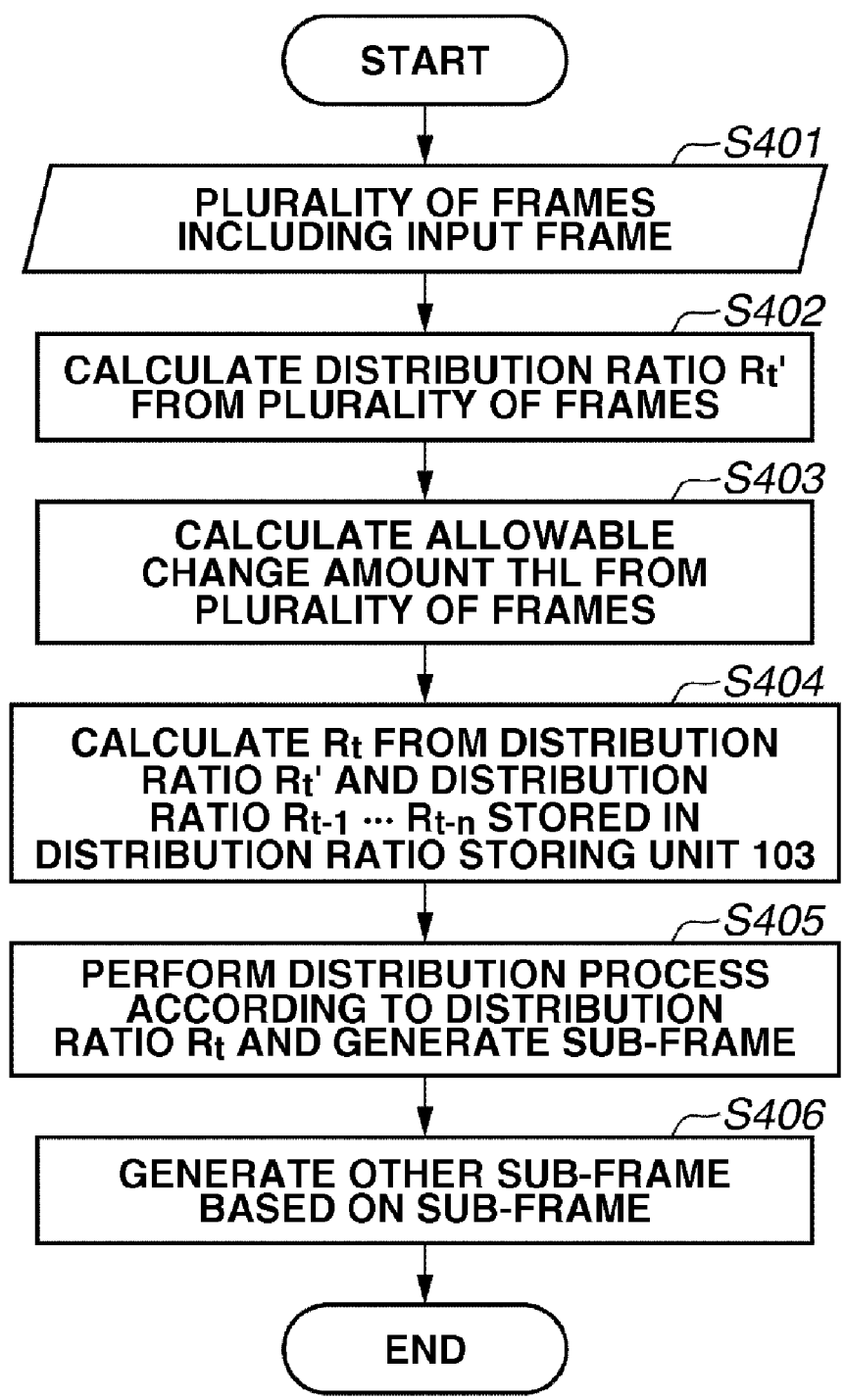
FIG. 9 is a flowchart illustrating a process performed by the moving image processing apparatus according to the second exemplary embodiment of the present invention.

FIG. 9 is a flowchart illustrating the process performed by the moving image processing apparatus according to the present exemplary embodiment.

The present exemplary embodiment describes a case where the process illustrated in FIG. 9 is performed by the CPU that controls the entire moving image processing apparatus by reading out from the RAM and executing as appropriate the program according to the present exemplary embodiment. However, the present invention can also be realized by forming each of the elements illustrated in FIG. 8 by hardware.

The process illustrated in FIG. 9 is started by switching on the display apparatus such as the digital TV. The process can also be started by the user setting the mode for performing double speed driving.

In step S401, the distribution ratio calculation unit 901 receives a plurality of input frames. In the example, the input frames Ft and Ft+1 are input. Two or more input frames can also be input. After the distribution ratio calculation unit 901 revives the plurality of input frames, the process proceeds to step S402.

In step S402, the distribution ratio calculation unit 901 calculates the distribution ratio Rt' from the plurality of input frames (Ft and Ft+1) input in step S401. As described above, the distribution ratio calculation unit 901 detects the moving region in the input frame Ft from the difference between the input frames Ft and Ft+1.

The distribution calculation unit 901 thus calculates the distribution ratio Rt' of the input frame Ft according to the motion amount of the moving region. The motion amount can also be acquired from motion information such as motion vector information. After the distribution ratio calculation unit 901 outputs the calculated distribution ratio Rt' of the input frame Ft to the distribution ratio correction unit 902, the process proceeds to step S403.

In step S403, the allowable amount calculation unit 907 calculates the allowable change amount THL from the input frames Ft and Ft+1, using the method described with reference to FIGS. 11A, 11B, and 11C.

After the allowable amount calculation unit 907 outputs the calculated allowable change amount THL to the distribution ratio correction unit 902, the process proceeds to step S404. The order of performing steps S402 and S403 can be reversed or can be at the same time.

In step S404, the distribution ratio correction unit 902 corrects the distribution ratio Rt' of the input frame Ft, which is output from the distribution ratio calculation unit 901, based on the past distribution ratio Rt−1 and the calculated allowable change amount THL.

The distribution ratio correction unit 902 then outputs the corrected distribution ratio Rt to the distribution ratio storing unit 903 and the distribution processing unit 904. The process then proceeds to step S405. The process of correcting the distribution ratio performed by the distribution ratio correction unit 902 will be described below with reference to FIG. 10.

In step S405, the distribution processing unit 904 generates the sub-frame Qt based on the input frame Ft and the distribution ratio Rt of the input frame Ft, which is output from the distribution ratio correction unit 902. For example, the distribution processing unit 904 sets, when the corrected distribution ratio Rt of the input frame Ft is 7:3 (0.3), the signal value of the sub-frame Qt as 0.3 times the signal value of the input frame Ft.

The distribution processing unit 904 outputs the calculated sub-frame Qt to the difference processing unit 905. Further, the sub-frame Qt generated by the distribution processing unit 904 is output to the outside via the switching unit 906. After the distribution processing unit 904 outputs the sub-frame Qt to the difference processing unit 905, the process proceeds to step S406.

In step S406, the difference processing unit 905 generates the sub-frame Pt based on the input frame Ft and the sub-frame Qt output from the distribution processing unit 904. The difference processing unit 905 thus generates the difference between the input frame Ft and the sub-frame Qt as the sub-frame Pt.

As a result, if the corrected distribution ratio of the input frame Ft is 7:3 (0.3), the sub-frame Pt is acquired by multiplying the pixel value of the input frame Ft by 0.7. The sub-frame PT generated by the difference processing unit 905 is output to the outside via the switching unit 906. After the difference processing unit 905 generates the sub-frame Pt, the process returns to step S401. The distribution ratio of the input frame t+1 is determined and the sub-frames are generated and output based on the input frames t+1 and t+2.

The process of correcting the distribution ratio according to the present exemplary embodiment will be described below with reference to FIG. 10.

Figure 10:
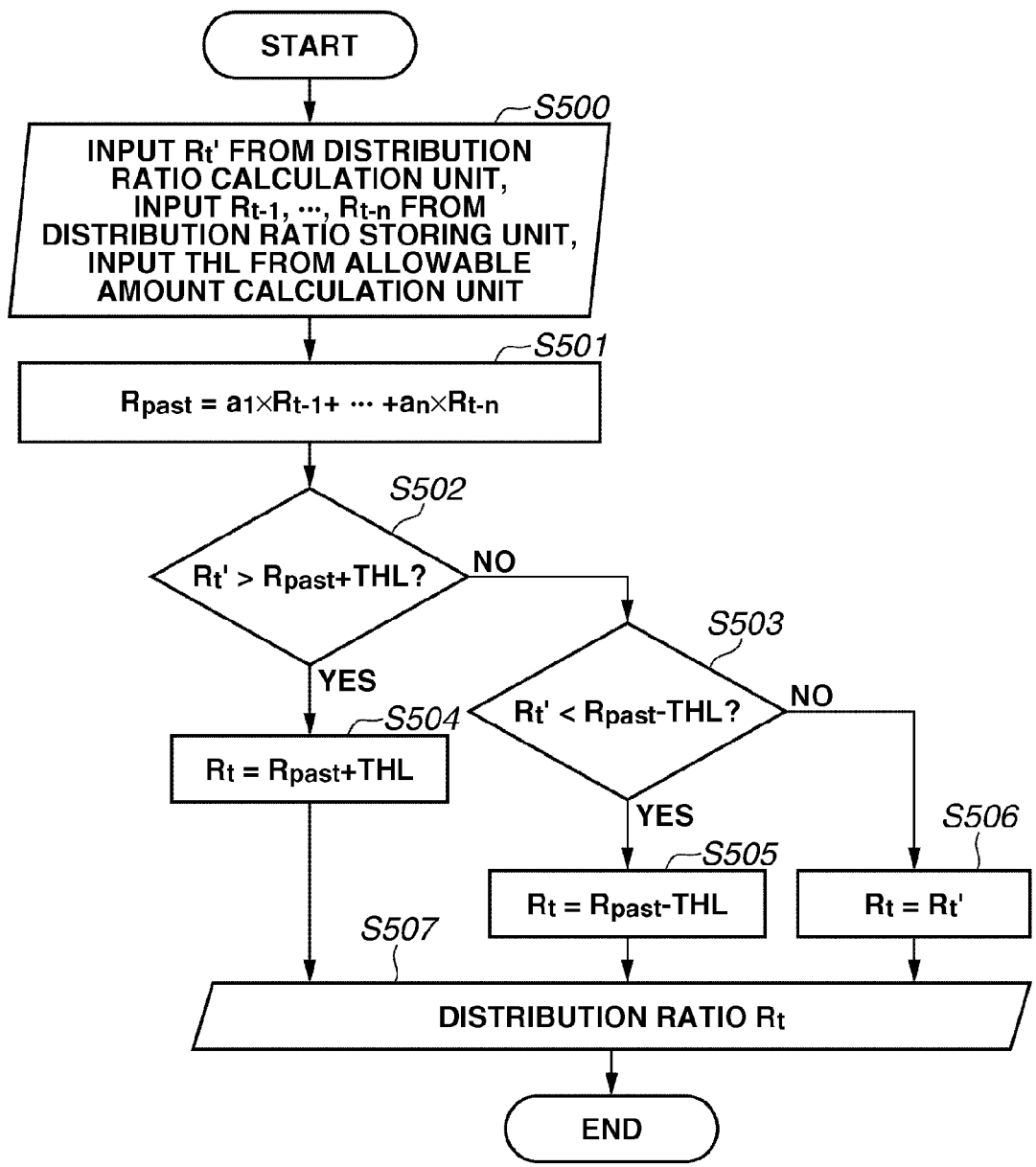
FIG. 10 is a flowchart illustrating a process performed by the distribution ratio correction unit according to the second exemplary embodiment of the present invention.

FIG. 10 is a flowchart illustrating the process of correcting the distribution ratio R' performed by the distribution ratio correction unit 902.

The process illustrated in FIG. 10 corresponds to the process performed in step S404 illustrated in FIG. 9. Further, the present exemplary embodiment describes a case where the distribution ratio Rt' of the input frame Ft is corrected. Furthermore, in the present exemplary embodiment, the distribution ratio is expressed based on the ratio of the pixel values of the sub-frame Q and the input frame F, as described above.

For example, if the distribution ratio of the input frame F is 7:3, the pixel value of the sub-frame P is 0.7 times the pixel value of the input frame F, and the pixel value of the sub-frame Q is 0.3 times the pixel value of the input frame F. The distribution ratio thus becomes 0.3.

In step S500, the distribution ratio correction unit 902 acquires the distribution ratio Rt' of the input frame Ft from the distribution ratio calculation unit 901. Further, the distribution ratio correction unit 902 acquires the past distribution ratio Rt−1 from the distribution ratio storing unit 903.

The distribution ratio Rt−1 is the distribution ratio of the input frame Ft−1 that is input before the input frame Ft and corrected by the distribution ratio correction unit 902. The present exemplary embodiment uses the corrected distribution ratio of the input frame Ft−1 as the past distribution ratio. However, the corrected distribution ratio of the past plurality of input frames can also be used.

Further, in step S500, the distribution ratio correction unit 902 acquires from the allowable amount calculation unit 907 the allowable change amount THL of the input frame Ft. The allowable change amount THL is calculated by the allowable amount calculation unit 907 by the process described with reference to FIGS. 11A, 11B, and 11C.

After the distribution ratio correction unit 902 acquires the distribution ratio Rt', the previous distribution ratio Rt−1, and the allowable change amount THL, the process proceeds to step S501.

In step S501, the distribution ratio correction unit 902 calculates the past distribution ratio Rpast. In the present exemplary embodiment, since the distribution ratio correction unit 902 only acquires the distribution ratio Rt−1 of the input frame Ft−1, Rpast becomes the same value as Rt−1.

However, if the corrected distribution ratios of a plurality of input frames are to be used, the distribution ratio correction unit 902 acquires Rpast by weighting each distribution ratio based on the closeness to the input frame Ft in terms of the reproduction order. After the distribution ratio correction unit 902 calculates the past distribution ratio Rpast, the process proceeds to step S502.

In step S502, the distribution ratio correction unit 902 compares the sum of the past distribution ratio Rpast and the allowable change amount THLt calculated in step S500 with the distribution ratio Rt' calculated by the distribution ratio calculation unit 901.

More specifically, the distribution ratio correction unit 902 determines whether the distribution ratio Rt' is greater than the sum of the past distribution ratio Rpast and the allowable change amount THL. If the distribution ratio Rt' is greater than the sum of the past distribution ratio Rpast and the allowable change amount THL (YES in step S502), the process proceeds to step S504. On the other hand, if the distribution ratio Rt' is less than or equal to the sum of the distribution ratio Rt−1 and the allowable change amount THL (NO in step S502), the process proceeds to step S2503.

In step S504, the distribution ratio correction unit 902 sets the sum of the past distribution ratio Rpast and the allowable change amount THL as the corrected distribution ratio Rt of the input frame Ft.

In other words, if the distribution ratio Rt' calculated by the distribution ratio calculation unit 901 is determined to be greater than the sum of the past distribution ratio Rpast and the allowable change amount THL (No in step S503), the corrected distribution ratio Rt is determined as described below. The distribution ratio correction unit 902 corrects the distribution ratio Rt' to be the highest distribution ratio within the allowable change amount and determines the distribution ratio Rt. After the distribution ratio correction unit 902 determines the corrected distribution ratio Rt, the process proceeds to step S507.

On the other hand, in step S503, the distribution ratio correction unit 902 compares the difference between the past distribution ratio Rpast and the allowable change amount THL calculated in step S501 with the distribution ratio Rt' calculated by the distribution ratio calculation unit 901. The distribution ratio correction unit 902 thus determines whether the distribution ratio Rt' is less than the difference between the past distribution ratio Rt−1 and the allowable change amount THL.

If it is determined that the distribution ratio Rt' is less than the difference between the past distribution ratio Rpast and the allowable change amount THL (YES in step S503), the process proceeds to step S505. If it is determined that the distribution ratio Rt' is greater than or equal to the difference between the past distribution ratio Rpast and the allowable change amount THL (NO in step S503), the process proceeds to step S506.

In step S505, the distribution ratio correction unit 902 sets the difference between the past distribution ratio Rpast and the allowable change amount THL as the corrected distribution ratio Rt of the input frame Ft.

More specifically, if it is determined in step S503 that the distribution ratio Rt' calculated by the distribution ratio calculation unit 901 is less than the difference between the past distribution ratio Rpast and the allowable change amount THL, the distribution ratio Rt is determined as follows. The distribution ratio correction unit 902 corrects the distribution ratio Rt' to be the lowest distribution ratio within the allowable change amount and determines the distribution ratio Rt. After the corrected distribution ratio Rt is determined, the process proceeds to step S507.

In step S506, the distribution ratio correction unit 902 determines the distribution ratio Rt' as the corrected distribution ratio Rt. The distribution ratio correction unit 902 thus does not correct the distribution ratio Rt' calculated by the distribution ratio calculation unit 901.

As described above, the distribution ratio correction unit 902 in the present exemplary embodiment does not correct the distribution ratio when the distribution ratio Rt' calculated by the distribution ratio calculation unit 901 is within the allowable change amount of the past distribution ratio Rpast. After the distribution ratio Rt is determined, the process proceeds to step S507.

The distribution ratio correction unit 902 thus sets an allowable range of the distribution ratio Rt of the input frame Ft. In the present exemplary embodiment, the allowable range of the distribution ratio Rt is between Rpast−THL to Rpast+THL.

In other words, the distribution ratio correction unit 902 sets the allowable range of the ratio of the image signal corresponding to the third output frame to the image signal corresponding to the fourth output frame based on the difference between the first input frame and the second input frame, and the ratio of the image signal corresponding to the first output frame to that of the second output frame.

The distribution ratio correction unit 902 then calculates the ratio of the image signal corresponding to the third output frame to the image signal corresponding to the fourth output frame according to the set allowable range and the motion of the image in the second input frame (i.e., steps S502 to step S506).

As described above, the allowable amount calculation unit 907 calculates the allowable range so that the allowable range increases as the difference between the input frames increases. More specifically, the allowable amount calculation unit 907 sets the allowable range so that the allowable range when the difference between the first input frame and the second input frame is of a first amount (i.e., a first allowable range) is wider than the allowable range when the difference between the first input frame and the second input frame is of a second amount (i.e., a second allowable range). The second amount is smaller than the first amount.

In step S507, the distribution ratio correction unit 902 outputs the acquired distribution ratio Rt to the distribution ratio storing unit 903 and the distribution processing unit 904. The process of correcting the distribution ratio thus ends.

As described above, the moving image processing apparatus according to the present exemplary embodiment sets the allowable change amount according to the input frame.

When the difference between the input frames is small, the allowable change amount is calculated so that the allowable change amount from the past distribution ratio becomes small. If the difference between the input frames is great, the allowable change amount is calculated so that the allowable change amount from the past distribution ratio becomes large.

As a result, the change in the distribution ratio can be made small in the video image in which the change in brightness is noticeable, such as when the object in the video image does not move.

On the other hand, the change in the distribution ratio can be made large in a video image in which a change in the brightness is not noticeable, such as when there is a drastic change in the video image or when there is a change in the scene.

Figure 12:
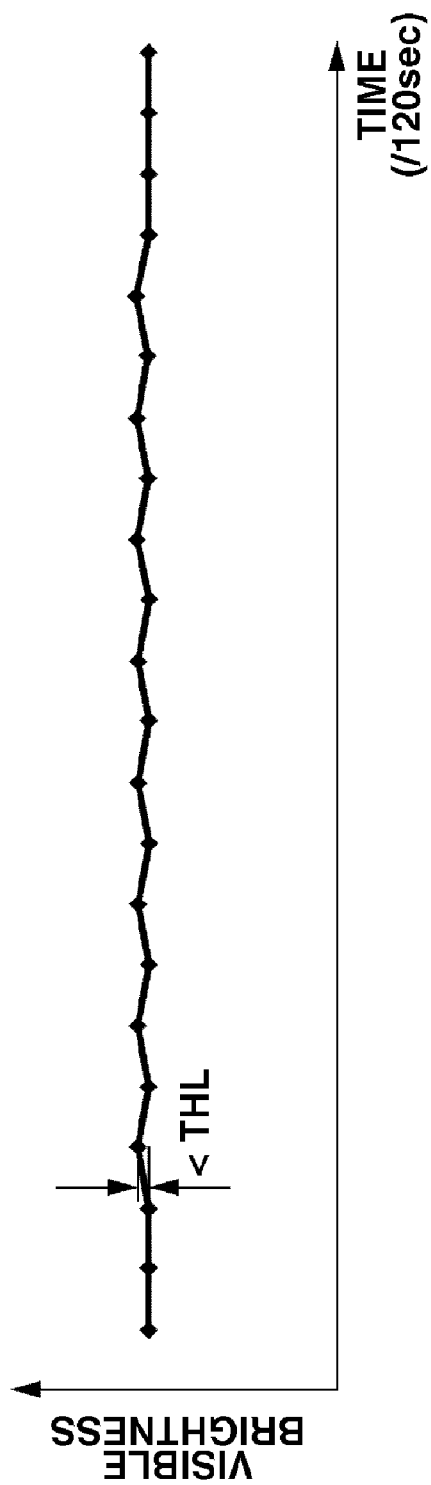
FIG. 12 illustrates a first example of a brightness of the screen when the user views the output according to the corrected distribution ratio according to the second exemplary embodiment of the present invention.

FIG. 12 illustrates an example of a sub-frame output when the difference between the input frames is small. In such a case, since the distribution ratio does not change greatly, the change in the brightness of the display screen is suppressed.

Figure 13:
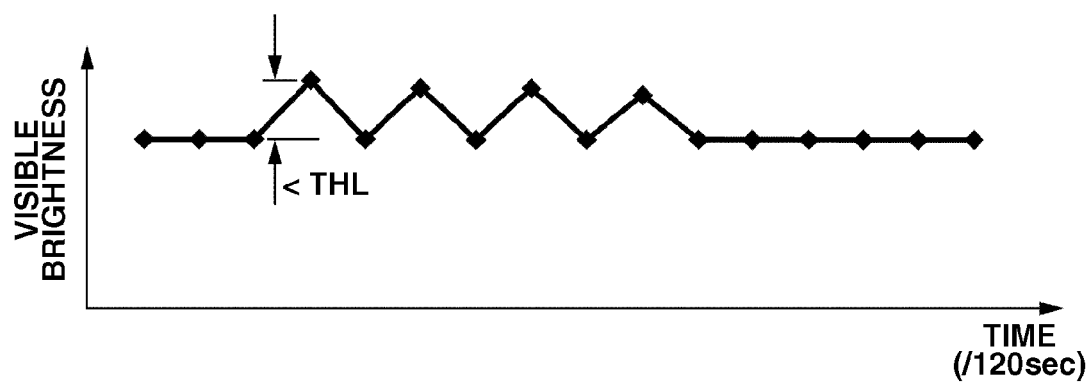
FIG. 13 illustrates a second example of a brightness of the screen when the user views the output according to the corrected distribution ratio according to the second exemplary embodiment of the present invention.

On the other hand, FIG. 13 illustrates an example of a sub-frame output when the difference between the input frames is great. In such a case, since the distribution ratio can be greatly changed, the sub-frame can be generated by a distribution ratio, which is closer to the distribution ratio according to the motion amount of the input frame.

The method for correcting the distribution ratio described in the second exemplary embodiment can also be employed in setting the distribution ratio for each region. In such a case, the allowable amount calculation unit 907 calculates the allowable change amount THL for each region of the input frame according to the difference information between the input frames. The distribution ratio correction unit 902 then determines the distribution ratio [Rt] for each region based on the calculated allowable change amount and the distribution ratio [Rt'] for each region of the input frame Ft. Further, it is effective to add the LPF similar to the first exemplary embodiment.

Aspects of the present invention can also be realized by a computer of a system or apparatus (or devices such as a CPU or micro-processing unit (MPU)) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. The program includes computer-executable instructions for implementing the present invention. For this purpose, the program is provided to the computer for example via a network or from a recording medium of various types serving as the memory device (e.g., computer-readable storage medium). In such a case, the system or apparatus, and the recording medium where the program is stored, are included as being within the scope of the present invention.

An operating system (OS) or other application software running on a computer can execute part or all of actual processing based on instructions of the program to realize the functions one or more of the above-described exemplary embodiments.

Additionally, the program read out of a storage medium can be written into a memory of a function expansion card inserted in a computer or into a memory of a function expansion unit connected to the computer. In this case, based on instructions of the program, a CPU or MPU provided on the function expansion card or the function expansion unit can execute part or all of the processing to realize the functions of one or more of the above-described exemplary embodiments.

A wide variety of storage media may be used to store the program. The storage medium may be, for example, any of a flexible disk (floppy disk), a hard disk, an optical disk, a magneto-optical disk, a compact disc (CD), a digital versatile disc (DVD), a read only memory (ROM), a CD-recordable (R), a CD-rewritable, a DVD-recordable, a DVD-rewritable, a magnetic tape, a nonvolatile memory card, a flash memory device, and so forth.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-296695 filed Nov. 20, 2008, which is hereby incorporated by reference herein in its entirety.

What is claimed is:

1. A moving image processing apparatus configured to generate a plurality of output frames from one input frame, the apparatus comprising:
an input unit configured to input a first input frame and a second input frame following the first input frame;
a determination unit configured to determine a first distribution ratio for generating at least a first output frame and a second output frame from the first input frame, and to determine a second distribution ratio for generating at least a third output frame and a fourth output frame from the second input frame according to a motion of an image in the second input frame, wherein the determination unit sets an allowable range of the second distribution ratio based on a difference between the first and the second input frames and the first distribution ratio, and wherein the determination unit determines the second distribution ratio according to a motion of an image in the second input frame so that the second distribution ratio is within the set allowable range; and
a generation unit configured to generate the first output frame and the second output frame from the first input frame based on the first distribution ratio, and to generate the third output frame and the fourth output frame from the second input frame based on the second distribution ratio.

2. The moving image processing apparatus according to claim 1, wherein the determination unit determines the second distribution ratio so that the difference between the first distribution ratio and the second distribution ratio becomes less than or equal to a predetermined value.

3. The moving image processing apparatus according to claim 1, wherein the determination unit determines motion of the image in the second input frame based on a displacement amount of a moving region detected by a difference between the third input frame following the second input frame and the second input frame.

4. The moving image processing apparatus according to claim 1, wherein the determination unit determines, when a motion amount of an image in the second input frame is a first amount, the second distribution ratio so that a difference between a distribution amount from the second input frame to the third output frame and a distribution amount from the second input frame to the fourth output frame among output frames generated from the second input frame becomes greater than a difference between a distribution amount from the second input frame to the third output frame and a distribution amount from the second input frame to the fourth output frame when the motion amount is a second amount, which second amount is smaller than the first amount.

5. The moving image processing apparatus according to claim 1 wherein the determination unit determines the allowable range so that a first value of the allowable range when an amount of a difference between the first and the second input frames is a first amount, becomes wider than a second value of the allowable range when an amount of a difference between the first and the second input frames is a second amount, which second amount is smaller than the first amount.

6. The moving image processing apparatus according to claim 1, wherein the determination unit determines the first distribution ratio for each of a plurality of regions and determines the second distribution ratio for each of the regions according to the first distribution ratio determined for each of the regions.

7. A moving image processing method performed by a moving image processing apparatus configured to generate a plurality of output frames from one input frame, the method comprising:
inputting a first input frame and a second input frame following the first input frame;
determining a first distribution ratio for generating at least a first output frame and a second output frame from the first input frame, and determining a second distribution ratio for generating at least a third output frame and a fourth output frame from the second input frame according to a motion of an image in the second input frame, wherein an allowable range of the second distribution ratio is set based on a difference between the first and the second input frames and the first distribution ratio, and wherein the second distribution ratio is determined according to a motion of an image in the second input frame so that the second distribution ratio is within the set allowable range; and
generating the first output frame and the second output frame from the first input frame based on the first distribution ratio, and generating the third output frame and the fourth output frame from the second input frame based on the second distribution ratio.

8. A computer-readable storage medium storing a computer-executable program which causes a computer to generate a plurality of output frames from one input frame, the program comprising:
computer-executable instructions that cause the computer to input a first input frame and a second input frame following the first input frame;
computer-executable instructions that cause the computer to determine a first distribution ratio for generating at least a first output frame and a second output frame from the first input frame, and to determine a second distribution ratio for generating at least a third output frame and a fourth output frame from the second input frame according to a motion of an image in the second input frame, wherein an allowable range of the second distribution ratio is set based on a difference between the first and the second input frames and the first distribution ratio, and wherein the second distribution ratio is determined according to a motion of an image in the second input frame so that the second distribution ratio is within the set allowable range; and computer-executable instructions that cause the computer to generate the first output frame and the second output frame from the first input frame based on the first distribution ratio, and to generate the third output frame and the fourth output frame from the second input frame based on the second distribution ratio.

* * * * *